A. D. ANTOINE.
MACHINE FOR MAKING LIGHT MANTLES.
APPLICATION FILED JUNE 5, 1911. RENEWED FEB. 6, 1915.

1,131,893.

Patented Mar. 16, 1915.
12 SHEETS—SHEET 1.

A. D. ANTOINE.
MACHINE FOR MAKING LIGHT MANTLES.
APPLICATION FILED JUNE 5, 1911. RENEWED FEB. 6, 1915.

1,131,893.

Patented Mar. 16, 1915.
12 SHEETS—SHEET 2.

Witnesses:
Inventor:
Alfred D. Antoine
By Attys.

A. D. ANTOINE.
MACHINE FOR MAKING LIGHT MANTLES.
APPLICATION FILED JUNE 5, 1911. RENEWED FEB. 6, 1915.

1,131,893.

Patented Mar. 16, 1915.
12 SHEETS—SHEET 3.

Witnesses:
Inventor:
Alfred D. Antoine
By:
Attys:

A. D. ANTOINE.
MACHINE FOR MAKING LIGHT MANTLES.
APPLICATION FILED JUNE 5, 1911. RENEWED FEB. 6, 1915.
1,131,893.
Patented Mar. 16, 1915.
12 SHEETS—SHEET 4.
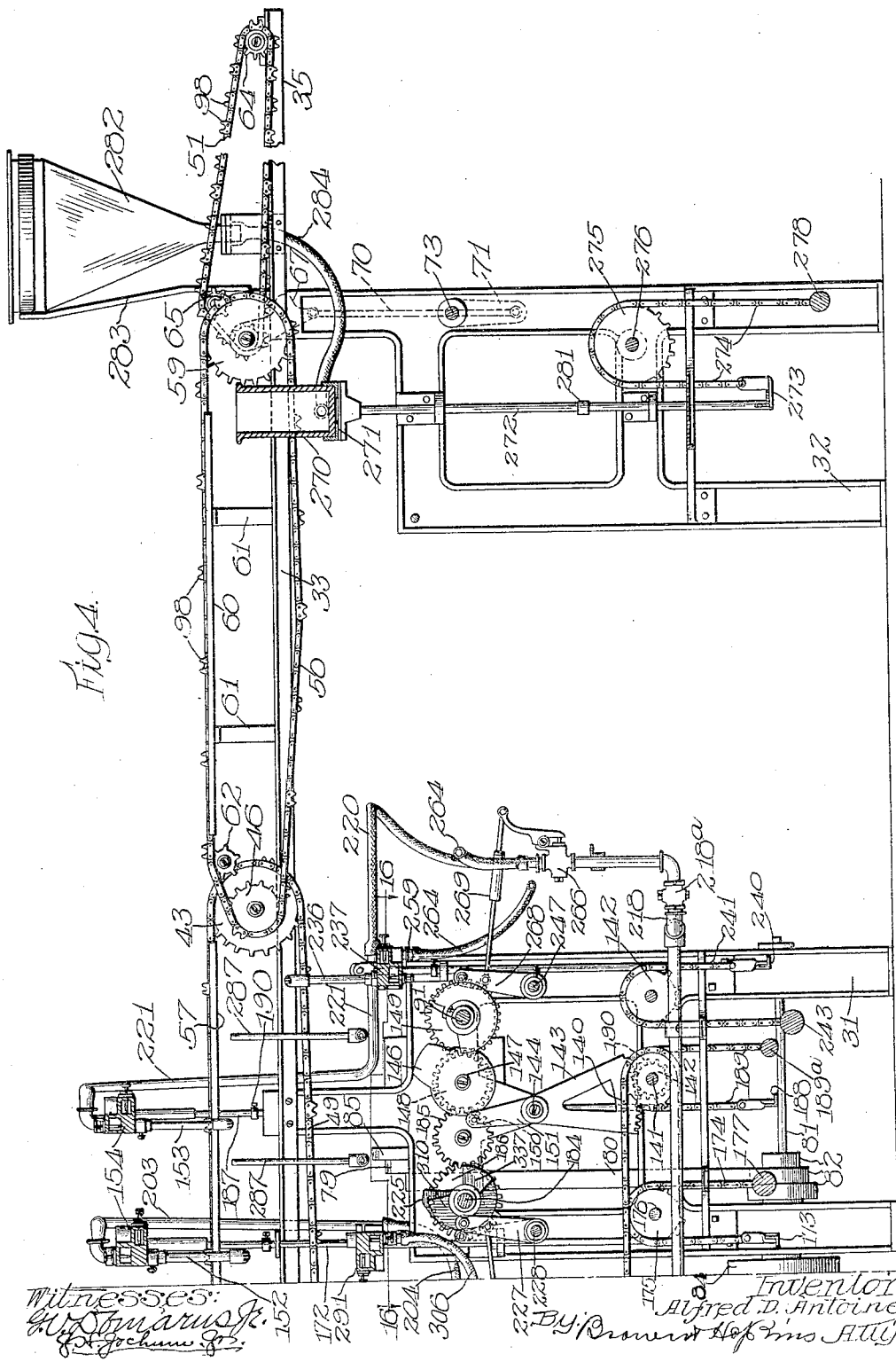

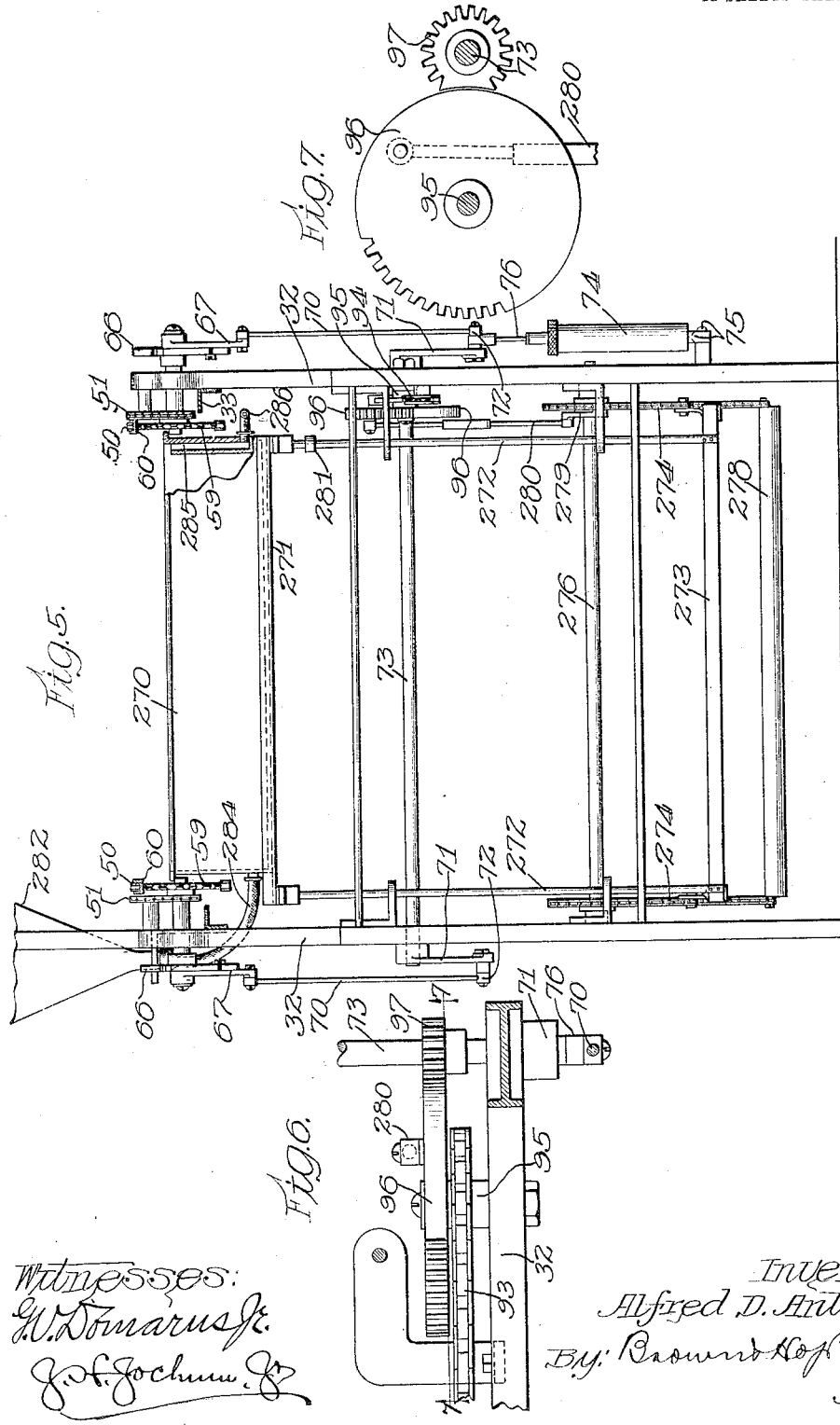

A. D. ANTOINE.
MACHINE FOR MAKING LIGHT MANTLES.
APPLICATION FILED JUNE 5, 1911. RENEWED FEB. 6, 1915.
1,131,893.
Patented Mar. 16, 1915.
12 SHEETS—SHEET 6.
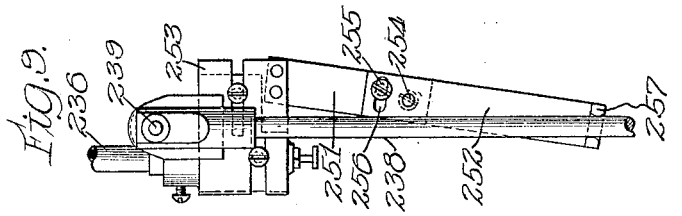
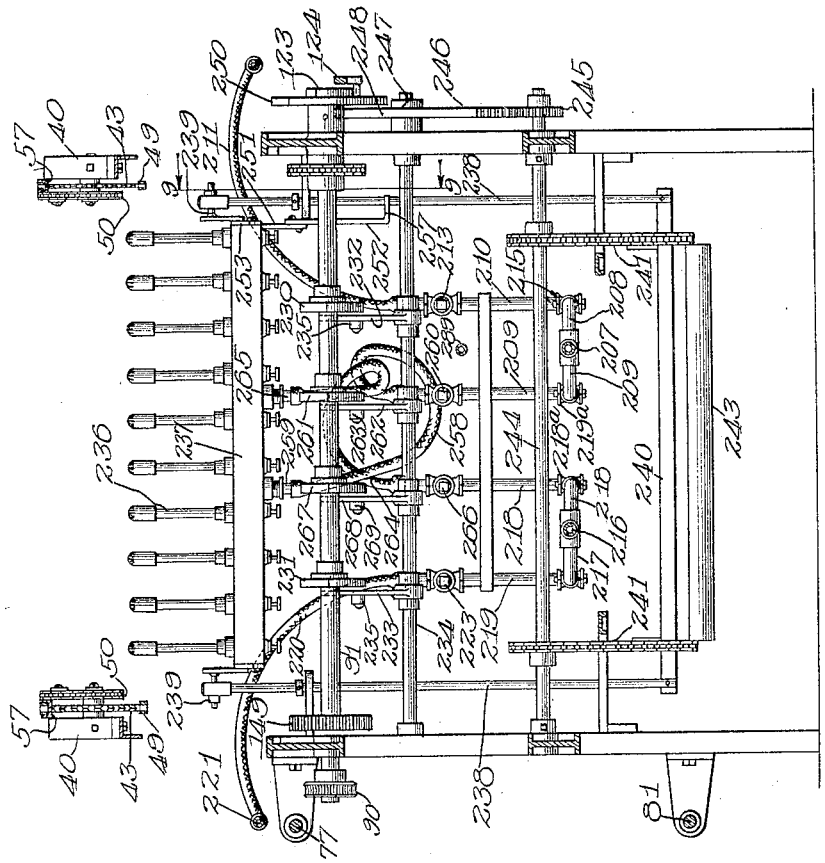

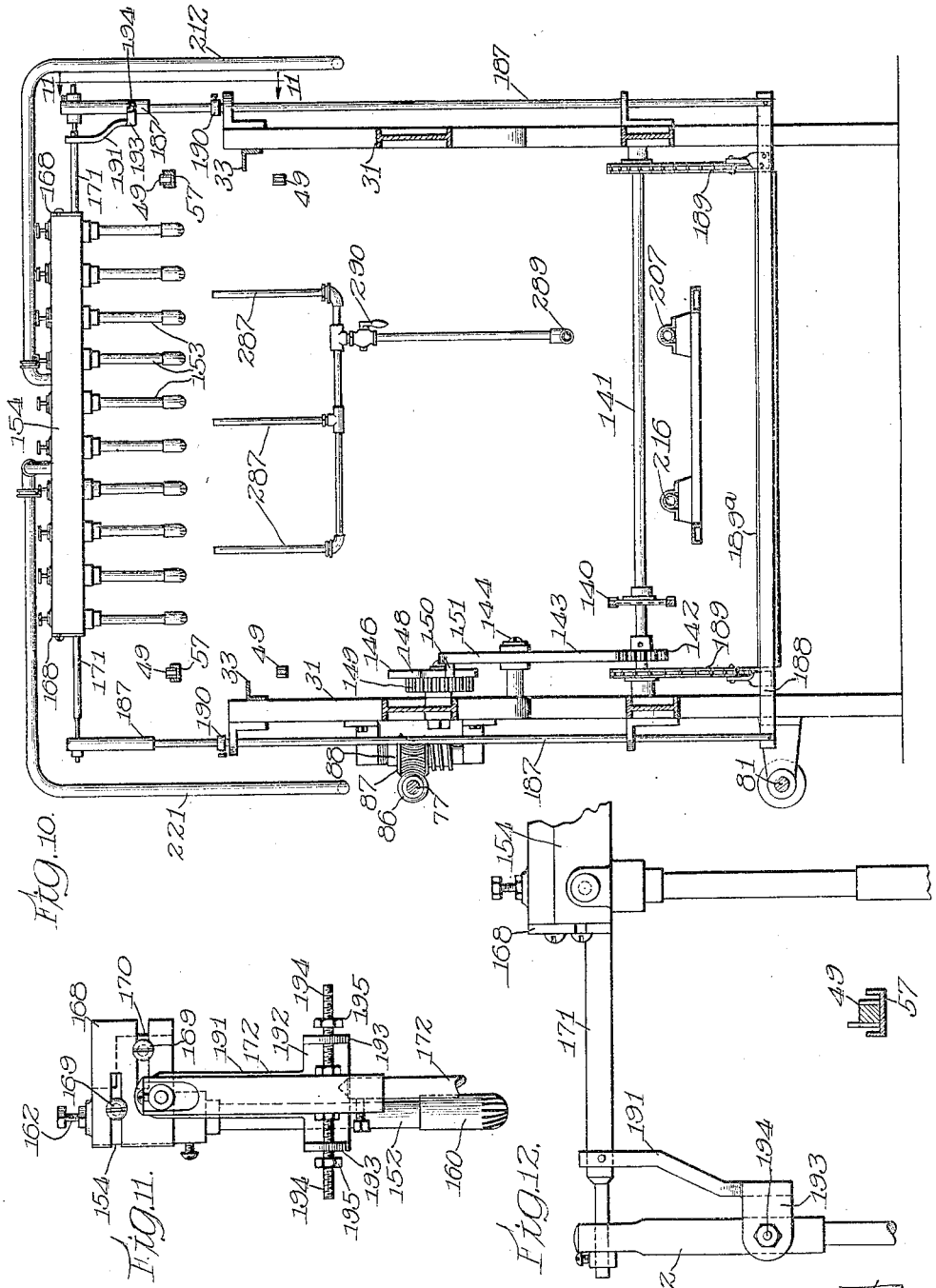

A. D. ANTOINE.
MACHINE FOR MAKING LIGHT MANTLES.
APPLICATION FILED JUNE 5, 1911. RENEWED FEB. 6, 1915.
1,131,893.
Patented Mar. 16, 1915.
12 SHEETS—SHEET 8.
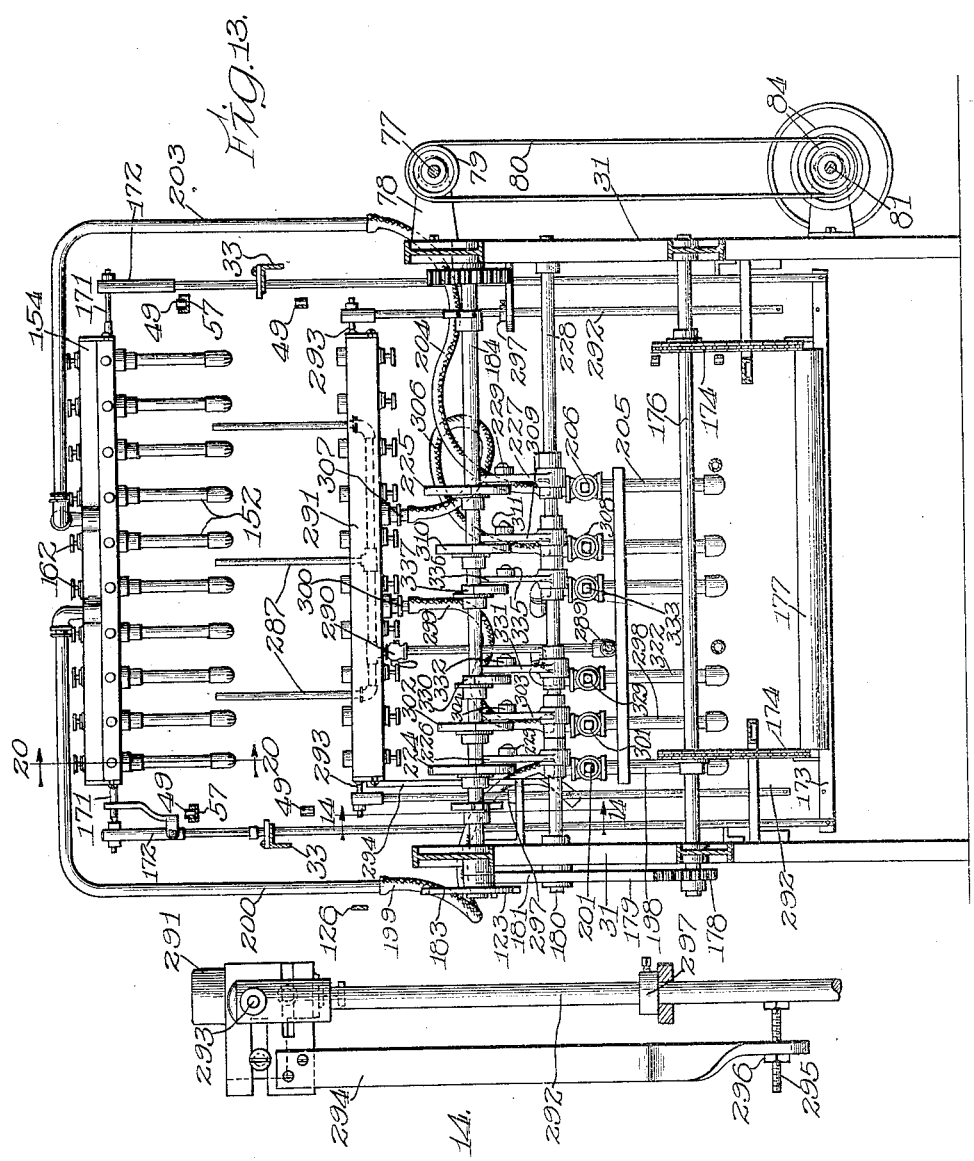

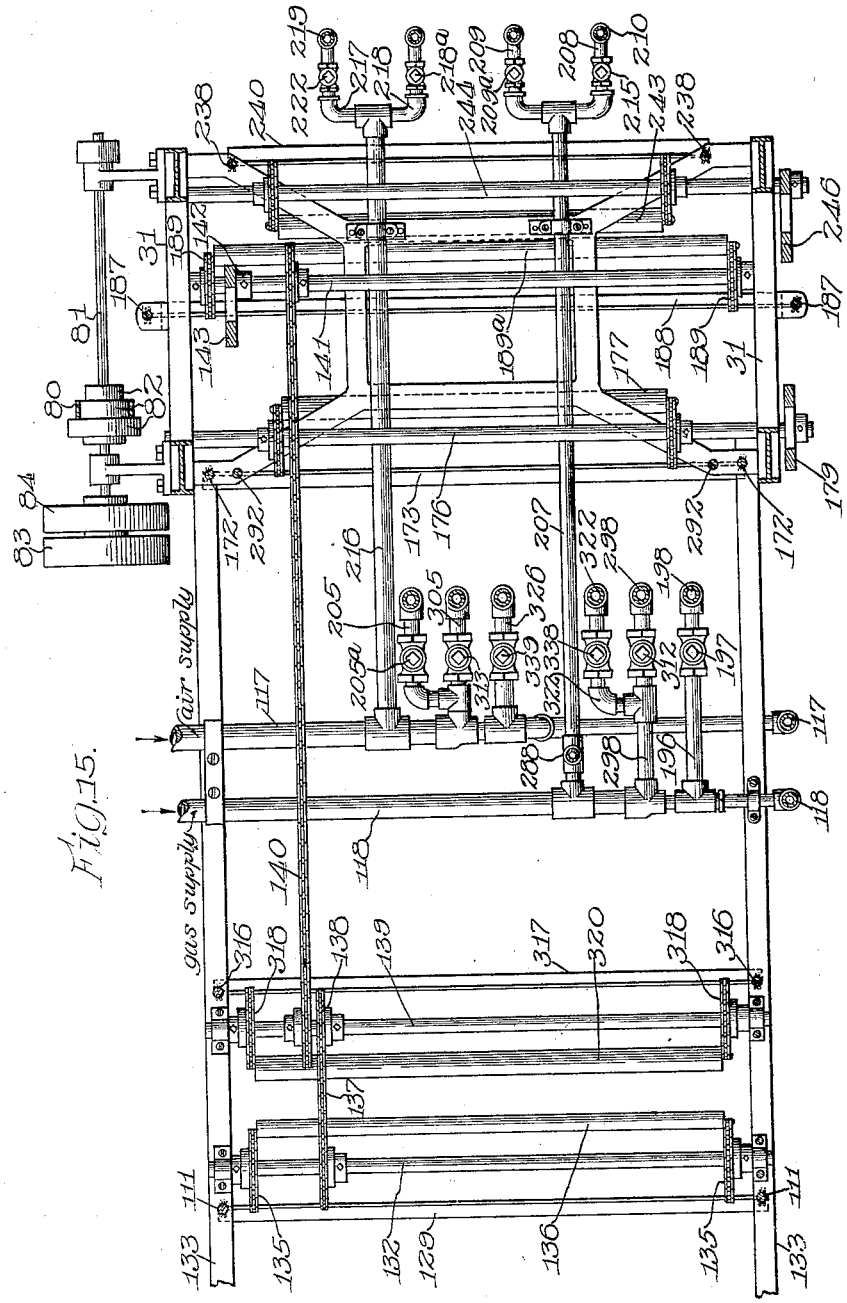

A. D. ANTOINE.
MACHINE FOR MAKING LIGHT MANTLES.
APPLICATION FILED JUNE 5, 1911. RENEWED FEB. 6, 1915.
1,131,893.
Patented Mar. 16, 1915.
12 SHEETS—SHEET 10.
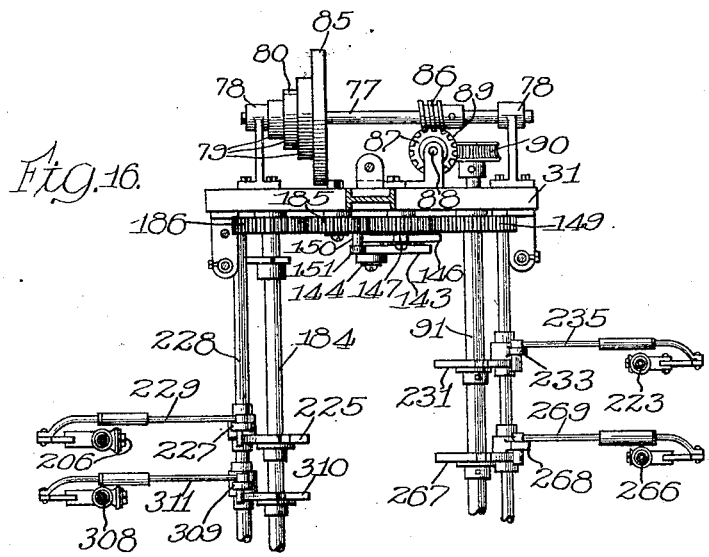
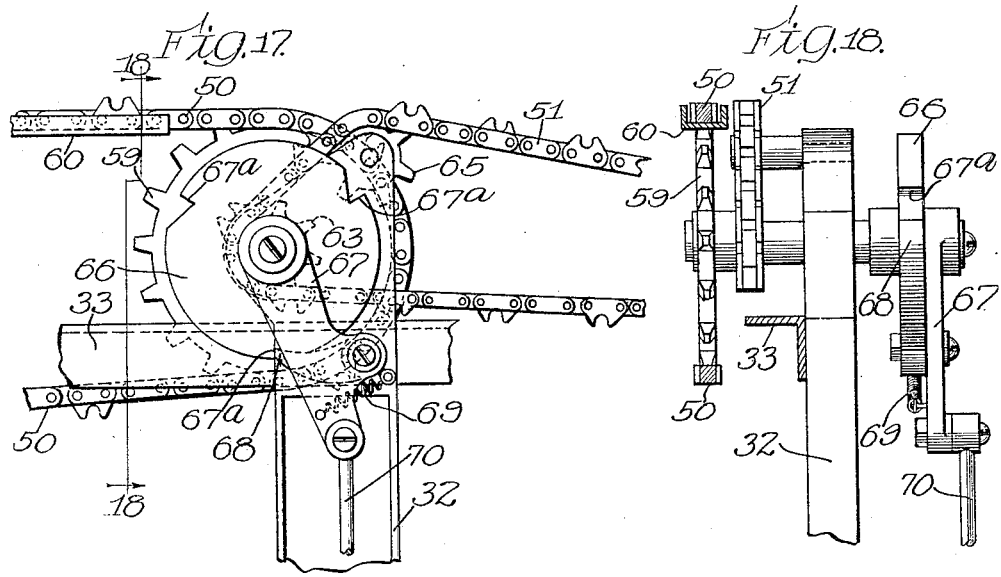
Witnesses:
G. W. Domarus Jr.
J. F. Jochum Jr.
Inventor:
Alfred D. Antoine
By Brown & Morris
Attys.

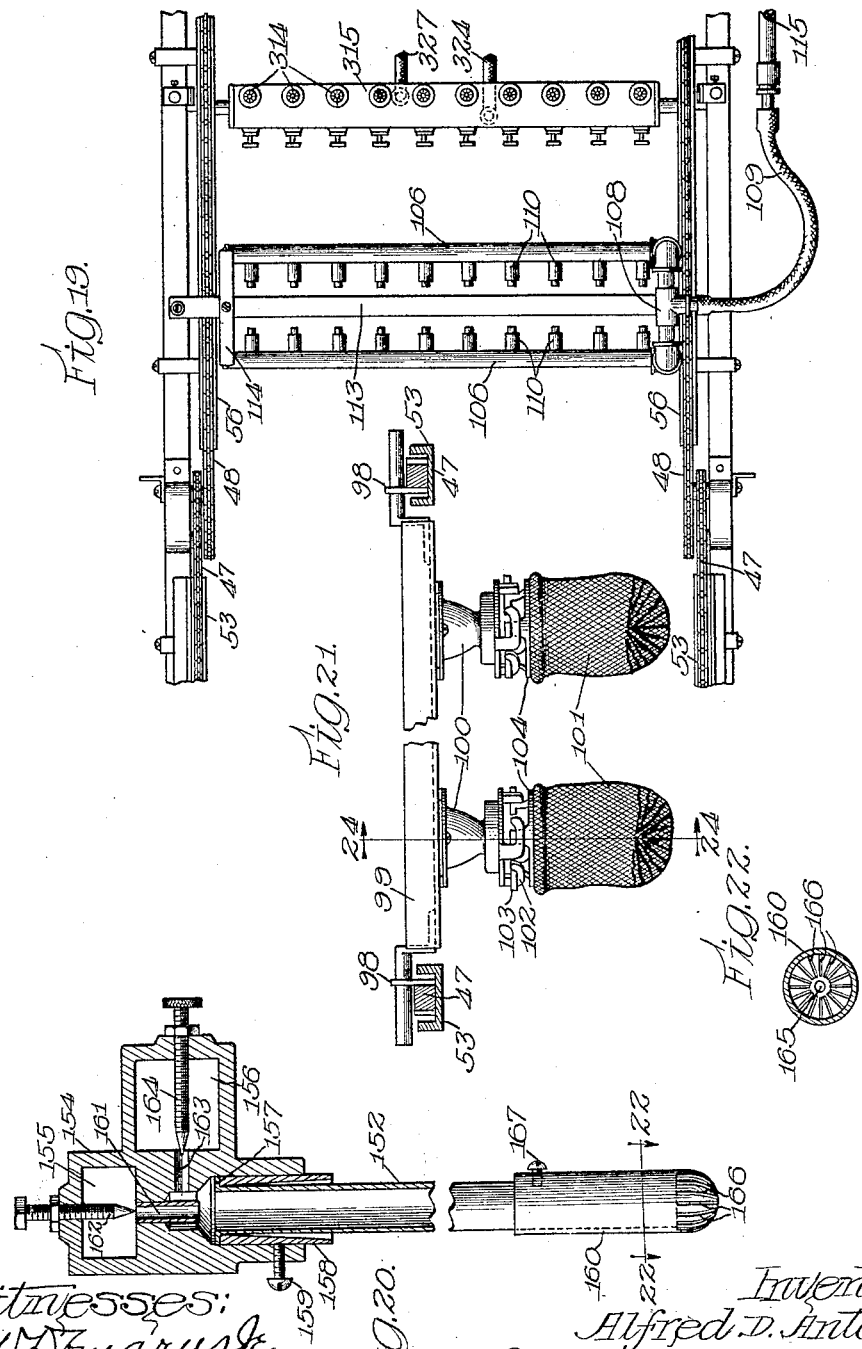

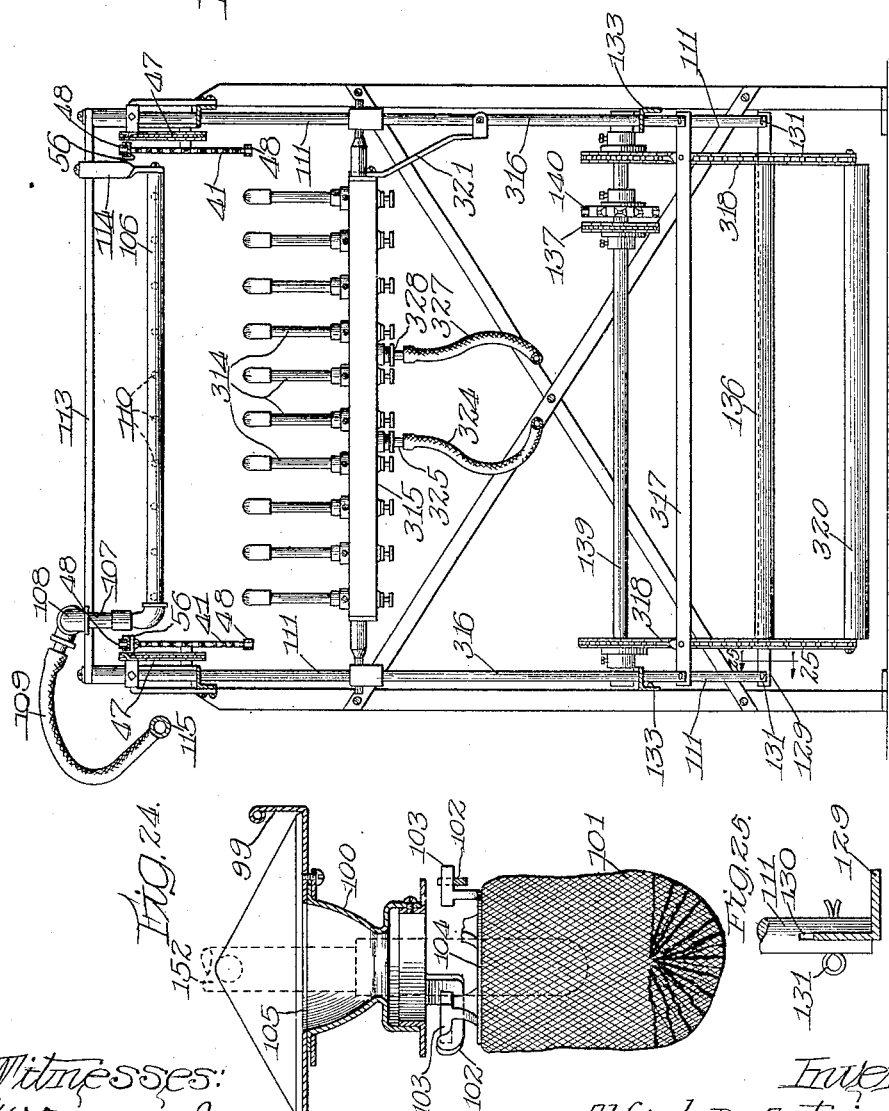

UNITED STATES PATENT OFFICE.

ALFRED D. ANTOINE, OF CHICAGO, ILLINOIS, ASSIGNOR TO CLARENCE C. TRAVIS, OF CHICAGO, ILLINOIS.

MACHINE FOR MAKING LIGHT-MANTLES.

1,131,893.  Specification of Letters Patent.  Patented Mar. 16, 1915.

Application filed June 5, 1911, Serial No. 631,422. Renewed February 6, 1915. Serial No. 6,636.

*To all whom it may concern:*

Be it known that I, ALFRED D. ANTOINE, a citizen of the United States, residing at Chicago, in the county of Cook and State of Illinois, have invented certain new and useful Improvements in Machines for Making Light-Mantles, of which the following is a specification.

This invention relates to machines for manufacturing incandescent mantles and more particularly to that type of machines in which the mantles are intermittently advanced therethrough and during which advancement they are subjected successively to a preliminary burning off, shaping, hardening, and immersion in a preserving solution, and one of the objects of the invention is the provision of an improved machine of this class having means whereby a plurality of mantles may be simultaneously treated by the various steps of operation, thereby producing an effective and efficient machine of large capacity and of compact arrangement.

With this and other objects in view the invention consists substantially in the features of novelty in the construction, combination and arrangement of the several parts hereinafter more fully described and claimed and shown in the accompanying drawings, in which—

Figure 1:
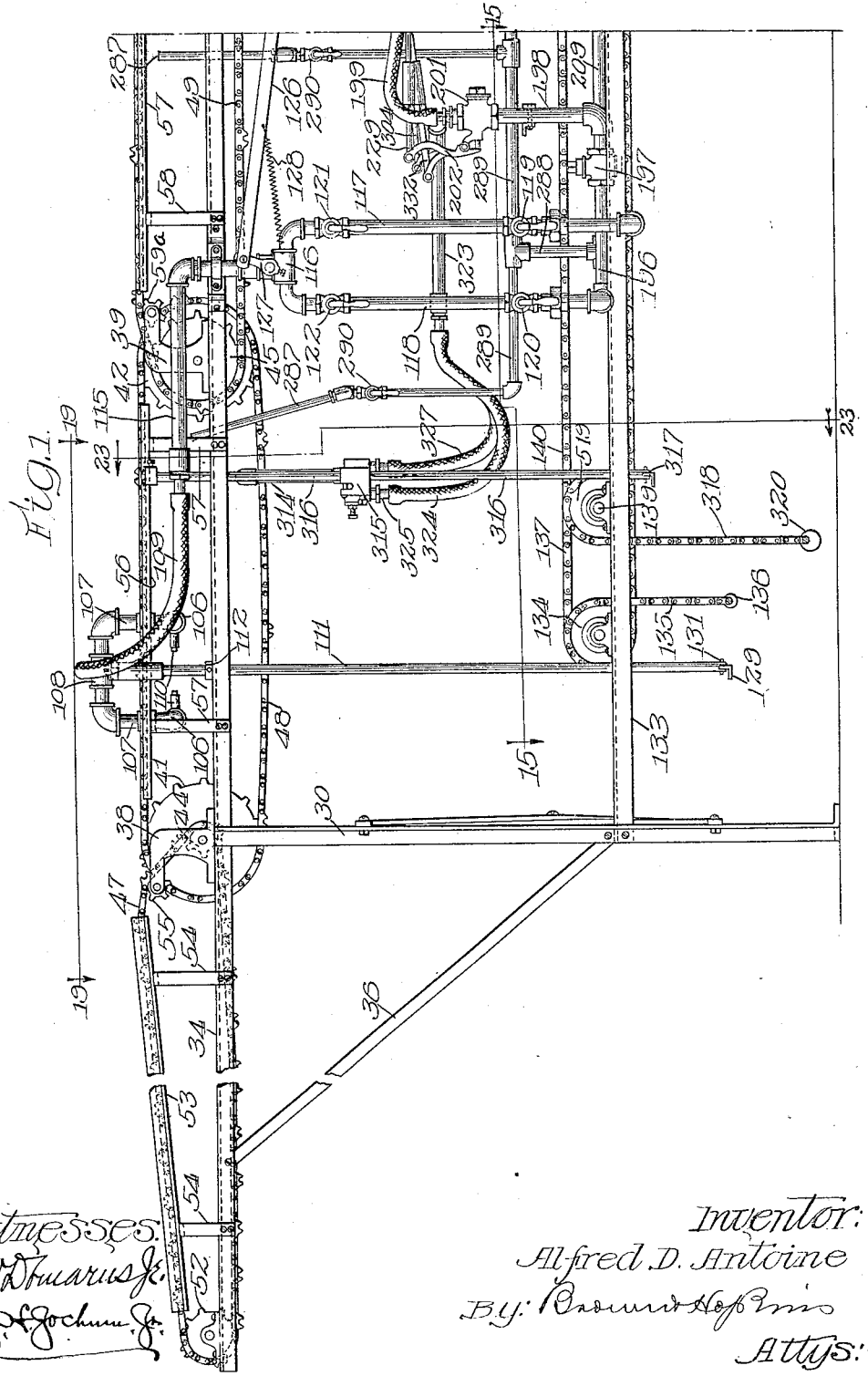
Figure 2:
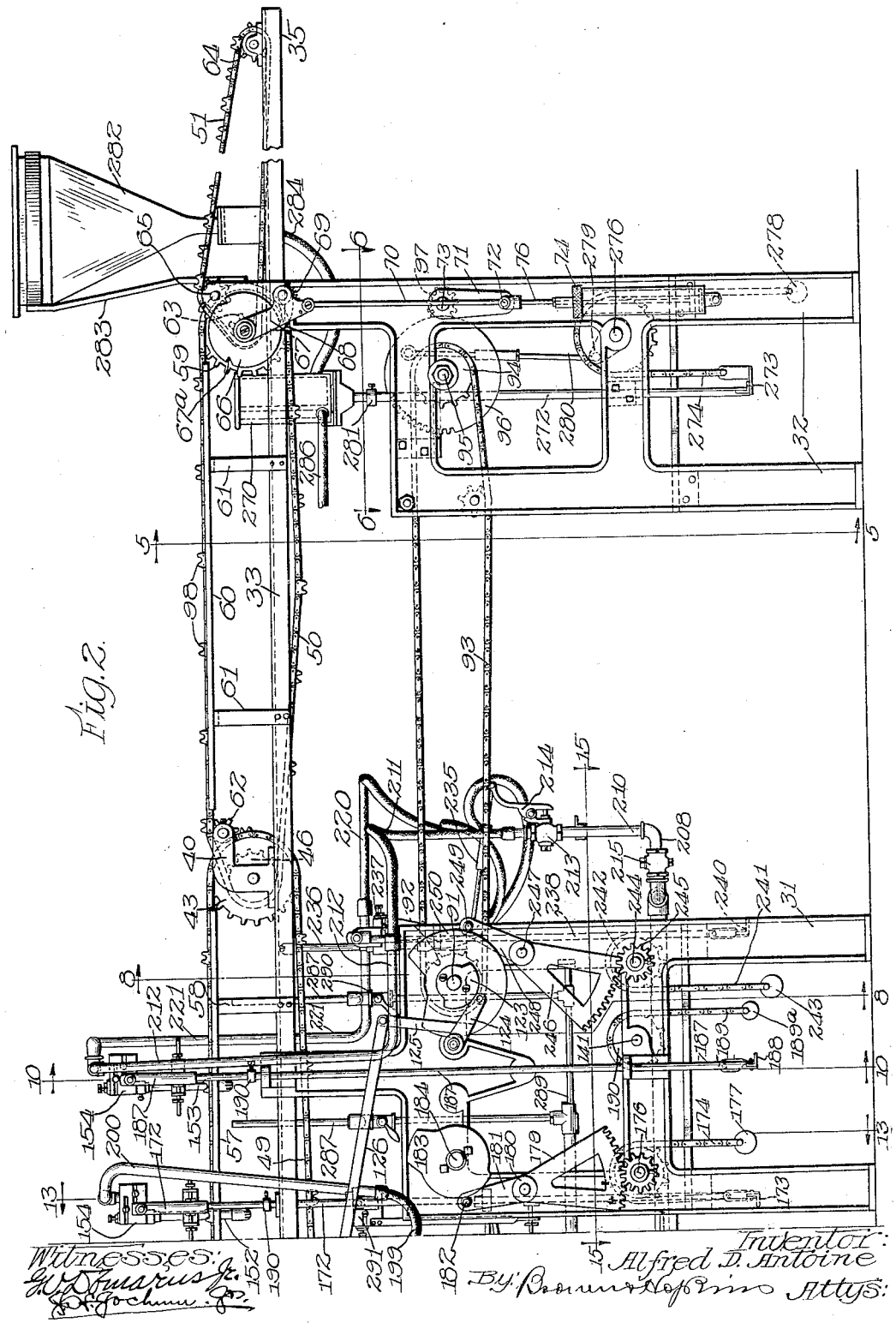
Figure 3:
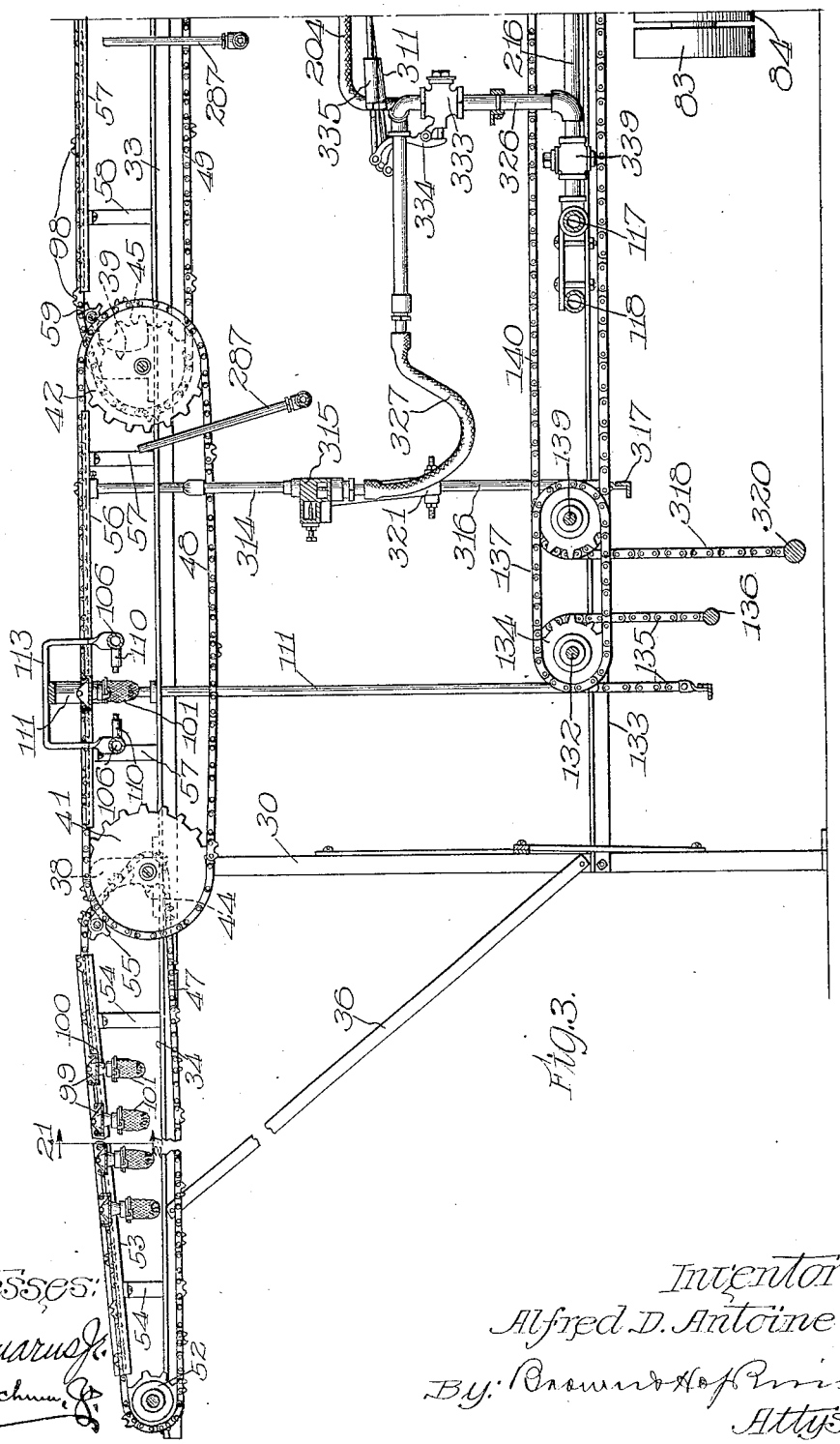

Figures 1 and 2 are side elevations of an improved machine of this class constructed in accordance with the principles of this invention. Figs. 3 and 4 are longitudinal sectional views of Figs. 1 and 2. Fig. 5 is a transverse vertical sectional view on line 5—5, Fig. 2, with parts broken away. Fig. 6 is a detail sectional view on line 6—6, Fig. 2. Fig. 7 is a view taken on line 7—7, Fig. 6. Fig. 8 is a view taken on line 8—8, Fig. 2. Fig. 9 is a detail sectional view taken on line 9—9, Fig. 8. Fig. 10 is a sectional view on line 10—10, Fig. 2. Fig. 11 is a detail view taken on line 11—11, Fig. 10. Fig. 12 is a right hand elevation of Fig. 11. Fig. 13 is a sectional view on line 13—13, Fig. 2. Fig. 14 is a detail view taken on line 14—14, Fig. 13. Fig. 15 is a sectional view taken on lines 15—15, Figs. 1 and 2. Fig. 16 is a view taken on line 16—16, Fig. 4. Fig. 17 is an enlarged detail end elevation of the mechanism for imparting intermittent advancing movement to the mantle carriers. Fig. 18 is a sectional view on line 18—18, Fig. 17. Fig. 19 is a detail top plan view taken on line 19—19, Fig. 1. Fig. 20 is a sectional view on line 20—20, Fig. 13. Fig. 21 is a sectional view on line 21—21, Fig. 3. Fig. 22 is a sectional view on line 22—22, Fig. 20. Fig. 23 is a sectional view on line 23—23, Fig. 1. Fig. 24 is a sectional view on line 24—24, Fig. 21. Fig. 25 is a detail sectional view on line 25—25, Fig. 23.

Referring more particularly to the drawings and in the present exemplification of the invention the mechanism is supported by a frame work of any desired construction and configuration but preferably consists of a series of spaced standards designated generally by the reference numerals 30, 31 and 32, and these standards may be connected by members 33 (see Figs. 1 to 4) arranged adjacent the top of the standards and extending longitudinally of the machine (see also Fig. 10). One of these members 33 is preferably arranged on each side of the machine with one extremity 34 projecting beyond the front standards 30 and the other extremity 35 projecting beyond the rear standard 32 and if desired a brace 36 may be provided for supporting the projection portion 34.

Arranged at intervals throughout the length of the machine are bearings 38, 39 and 40, in which are respectively journaled the shafts of sprocket wheels 41, 42 and 43, and secured respectively for rotation with the sprocket wheels 41, 42 and 43, are sprocket wheels 44, 45 and 46. One set of these bearings and sprocket wheels is located on each side of the machine and the machine may be of any desired width so as to accommodate any number of mantles which are held by a support extending transversely of the machine, as will be hereinafter described. The conveyer for the mantles consists in a plurality of sections of endless flexible members 47, 48, 49, 50, 51, which are arranged end to end so as to successively receive the mantle supports and convey them through the machine. The section 47 is arranged at the front of the machine and passes over the sprocket wheel 44 adjacent the bearing 38 and another sprocket wheel 52 arranged in suitable bearings adjacent the forward end 37 of the members 33. The upper run of this section of the conveyer passes over a support and guide 53 which latter is in turn supported preferably from the extension 34 of the members 33 by means of uprights or standards 54 and an idler 55 may be provided and journaled in a portion of the bearing 38, over which idler the upper run of the conveyer section 57 passes so as to direct the mantle support from the conveyer section 47 to the conveyer section 48, which latter passes over the sprockets 41, 42. The upper run of the conveyer section 48 is supported and guided by means of a guide 56 similar to the guide 53 and is held in position by means of uprights 57. The conveyer section 49 passes over the sprockets 45, 43, with its upper run supported by a guide 57 held in position by the uprights 58 and an idler 59ª may be provided adjacent the end of the conveyer section 48, and over which the upper run of the conveyer section 49 passes. The conveyer section 50 passes over the sprocket 46 and a sprocket 59 which latter is journaled in a suitable bearing preferably in the upright or standard 32 at the rear of the machine and the upper run of this conveyer section 50 passes over a guide or support 60 held in position by means of the uprights 61. An idler 62 is also provided and is journaled in the bearing 40 adjacent the end of the conveyer section 49 and over which the upper run of the conveyer section 50 passes. A sprocket 63 over which the conveyer section 51 passes is secured for rotation with the sprocket 59 and a sprocket 64 is also provided for the conveyer section 51 and this sprocket 64 is journaled in a suitable bearing adjacent the extremity of the projecting end 35 of the member 33. An idler 65 is also provided for the conveyer section 51 and is located in close proximity to the sprocket wheels 59, 63. Thus it will be manifest that a mantle support which is placed upon the conveyer section 47 will be passed successively to the conveyer sections, through the machine until it reaches the conveyer sections 51 at the other end of the machine, and as these conveyer sections are all operatively connected, they will be operated simultaneously if motion is imparted to one of the conveyer sections. In order therefore to impart this motion to the conveyer sections, suitable mechanism is provided, such as a ratchet mechanism whereby intermittent movement will be imparted to the conveyers. This ratchet mechanism is preferably located adjacent the exit end of the machine, although it may be located at any other point and comprises a ratchet disk 66 (see particularly Fig. 17) having a series of notches 67ª in its periphery and this disk 66 is secured for rotation with the sprockets 59, 63. An oscillating arm 67 is supported for pivotal movement, preferably by one extremity, and a ratchet dog 68 is pivotally mounted upon the arm. The free extremity of the dog is adapted to travel about the periphery of the disk 66 so as to enter the shouldered notches 67ª thereof, and an elastic member 69 tends normally to move the dog in a direction to enter the notches. An oscillatory motion is imparted to the arm, preferably by means of a bar or rod 70 which is pivotally connected to the arm and also to a crank shaft 71. One of these arms 67 and the pawl and ratchet elements 66, 68, are provided on each side of the machine, so that the conveyer sections on both sides of the machine will be simultaneously and uniformly operated. One of the crank arms 71 is provided on each side of the machine and the bars or rods 70 are pivotally connected as at 72 to the respective crank arms 71, (as shown more clearly in Fig. 5). The crank arms are connected by means of a shaft 73 extending across the machine and is journaled in suitable bearings preferably in the uprights 32. Thus it will be manifest that when the shaft 73 is rotated, both of the crank arms 71 will be rotated and they in turn will move the arms 67 about their points of pivotal supports to cause the dogs 68 to move out of one of the notches 67ª and into a position to enter another of the notches, during a portion of the revolution of the cranks 71. During the remaining portion of the revolution of these cranks they will move the arms 67 in the opposite direction to impart one step of rotation to the ratchet disk 66 and also to the sprocket wheels 59, 63, and this motion which is imparted to the conveyer sections 50 will be imparted to the conveyer sections 49, 48, 47.

In order to retard the movements of the arms 67, a dash pot 74 (see Figs. 2 and 5) is provided and is pivotally supported as at 75. The piston rod 76 is pivotally connected to one of the crank arms 71. Motion is imparted to the shaft 73 from the shaft 77 of the machine (see particularly Figs. 13 and 16) and this shaft is journaled in suitable bearings 78 supported by any fixed portion of the frame work, preferably one of the intermediate standards or uprights 31. This shaft 77 is provided with a series of pulleys 79 over which the drive belt 80 passes and is adapted to be shifted from one of the pulleys to another in order to vary the speed of rotation of the shaft 77. Another shaft 81 (see Fig. 13) is provided with a series of pulleys 82 corresponding with the pulleys 79 on the shaft 77 and the drive belt 80 passes over and is adapted to be shifted from one of these pulleys 82 to another, (see also Fig. 15). The shaft 81 receives its motion from any suitable source, preferably by means of a belt which is adapted to pass over the fast and loose pulleys 83, 84 on the shaft 81.

A fly wheel 85 is provided on the shaft 77 and a worm gear 86 is secured to this shaft for rotation therewith and meshes with a worm gear 87 (see particularly Figs. 10 and 16) on a stub shaft 88. Another worm gear 89 is secured to the shaft 88 for rotation with the worm gear 87 and this worm gear 89 meshes with a worm gear 90 secured to the shaft 91 for rotation therewith and which shaft constitutes the main drive shaft for the machine (see also Figs. 13 and 16) inasmuch as the motion of all of the parts to be hereinafter described is derived from this shaft. The shaft 91 is journaled in suitable bearings preferably in the intermediate uprights or standards 31 and extends across the machine and secured to this shaft is a sprocket wheel 92 (see Figs. 2 and 10) over which a sprocket chain 93 passes. This sprocket chain also passes over a sprocket gear 94 (see also Figs. 5, 6 and 7) on a stub shaft 95 which latter is journaled in suitable bearings adjacent the shaft 73. A mutilated gear designated generally by the reference numeral 96 is also secured to the stub shaft 95 and for rotation with the sprocket gear 94, and a mutilated gear 97 is secured to the shaft 73 for rotation therewith and the teeth of these gears 96, 97, are adapted to mesh so as to impart intermediate rotation to the shaft 73 and the smooth portions of the gears 96, 97 are constructed to constitute the ordinary and well known form of Geneva lock. Thus it will be manifest that when motion is imparted to the main driving shaft, which motion is continuous, it will be imparted by means of the sprocket chain 93 to the stub shaft 95 and the motion of this shaft will be intermittently imparted to the shaft 73 through the medium of the gears 96, 97, and this intermittent movement of the shaft 73 will, through the medium of the pawl and ratchet mechanism 68, 66, impart an intermittent advancing movement to the mantle conveyers.

Each of the sections of the conveyers are provided with pockets or seats 98 adapted to receive the ends of the mantle support 99 (see Fig. 21), and the sections of the conveyers are so arranged with respect to each other that the ends of adjacent sections overlap in order that the mantle supports may be automatically delivered from one section of the conveyer to the next adjacent section.

The present machine is adapted for the manufacture of two different types of mantles which are known as upright mantles and inverted mantles. In the manufacture of these different types of mantles, the shaping and hardening burners which are adapted to operate upon one type are not adapted to operate upon the other type and therefore in order to adapt this machine for the manufacture of both types, burners must be provided which are necessary for the respective types and it is further necessary to provide an improved machine of this class whereby one set of burners or the burners necessary for a particular type may be rendered inactive while the burners necessary for the manufacture of the other type are rendered active. This is necessary because inverted mantles are provided with seams at their tips while the open ends are secured to a rim and the shaping burners are inserted into these mantles from the top while the tips, or the seamed portion of the mantles must be hardened from the outside. In the upright mantles, both ends are open and the shaping and hardening is effected from the inside of the mantle, the burners for performing this operation being inserted into the mantles from the bottom. It is also advisable in a machine adapted for the manufacture of upright mantles to provide a burner for initially or partially shaping the mantles before they reach the main shaping burners. The machine will first be described as being adapted for the manufacture of the inverted type of mantle.

The mantle holder 99 may be of any desired shape and configuration and of a length to extend entirely across the machine so that the ends of the support will rest in the pockets 98 of the conveyer sections arranged at the opposite sides of the machine (see particularly Figs. 21 and 24). Depending from these supports 99 are hanger members 100, one of which is provided for each of the mantles 101 and these hanger members may be provided with projections or fingers 102 for receiving the ears or projections 103 on the ring 104 to which the mantle 101 is secured. Before the supports 99 are placed in the machine the mantles 101 are connected with the respective hanger members 100 and these hanger members 100 are preferably tubular in construction as shown and register with an aperture or opening 105 in the supports 99 so as to permit the burners, to be hereinafter described, to be inserted into the mantles through the support 99 and to be withdrawn from the mantles after the respective steps of operation. After the mantles have been thus connected to the supports 99 the latter are placed within the pockets on the conveyer section 47, it being understood that during the operation of the machine the conveyer sections are all subjected to intermittent advancement. After the mantles pass from the conveyer section 47 they pass to the sections 48 and arranged at a suitable point in the advancement of the mantles, preferably after they have been delivered to the conveyer sections 48, they are subjected to the "burning off" operation. The burners for this operation will now be described, reference being had more particularly to Figs. 1, 19 and 24. These burners are arranged adjacent the front of the machine and preferably consist of a pair of parallel pipes 106 spaced from each other and extending across the machine. At the ends of these pipes 106 are arranged upright tubular portions 107 which are connected to a T-coupling 108, to the inlet of which latter is connected a flexible supply pipe 109 for supplying gas to the pipes 106. These pipes are spaced from each other and are each provided with a plurality of burners 110 projecting laterally therefrom with the burners of one pipe projecting toward and terminating short of the burners of the other pipe a sufficient distance to permit the mantles to stand between the burners. The pipes 106 are supported for vertical reciprocatory movement in any suitable manner, preferably by means of a frame comprising uprights 111 which move through suitable guides 112 and a cross bar 113 which connects the upper extremities of these uprights. The connection between the upright tubular ends of the pipes 106 with the T-coupling 108 passes over the cross bar 113 and forms a hanger or support for one end of the burner while a hanger 114, which is supported by the cross bar 113, forms a support for the other end of the burner and the flexible pipe 109 which is connected to the supply pipe 115 will permit the burners to be thus reciprocated. These burners are adapted to be elevated so as to be moved out of the way or raised above the upper runs of the conveyer sections 48 to permit one of the supports 99 and the mantles held thereby to assume a position that the mantles will stand between the burner tips 110 when the burner is lowered, (as shown more clearly in Fig. 3) and so as to be moved up and out of the way, after the burning off, to permit these mantles to be further advanced.

The gas for the burners is supplied through the pipes 109, 115, (see particularly Figs. 1 and 15) and the pipe 115 receives its supply through a mixing valve 116, the specific construction and operation of which latter forms no part of the present invention, suffice it to say that the valve is so constructed that when it is opened, the proper mixture of air and gas will be supplied to the pipe 115. An air pipe 117 and a gas pipe 118 are connected with the mixing valve 116 and these air and gas pipes (see Fig. 15) receive their supply from any suitable source. Valves 119, 120 are respectively provided in the pipes 117, 118, for the purpose of regulating the pressure supply to the burner and additional valves 121, 122, may also be provided in the pipes 117, 118, between the valves 119, 120 and the mixing valve 116 for a further or finer regulation of the supply of fluid to the mixing valve. The mixing valve 116 is adapted to be automatically opened and closed at the proper times and so that when the burners are in the position shown in Fig. 3 with respect to the mantles 101, the valve will be opened to its full extent to permit the gas and the air pressure to be supplied to the burners and when the burners are elevated so as to permit the mantles which have been burned off, to advance, the mixing valve will be adjusted to shut off the air pressure supply and a portion of the gas supply, so that only a small flame will be maintained at the burners. This automatic opening of the valve 116 is preferably accomplished from the main driving shaft 91 (see particularly Figs. 1, 2 and 3) and for this purpose there is provided on the shaft 91 a cam 123 which coöperates with a pivotally supported arm 124 having an extension 125 which latter is connected by means of a link 126 with the operating handle 127 of the valve 116. The cam 123 is so timed with respect to the arm 124 that at the proper interval it will operate upon the arm to open the valve against the tension of an elastic member 128 which latter tends normally to move the operating handle 127 of the valve 116 in a direction to close the valve.

The burners are given their vertical reciprocating movement from the main drive shaft 91 in a manner which will now be described, reference being had more particularly to Figs. 1 to 4 and 15. The uprights 111 are connected by means of a cross bar 129 (see also Fig. 25) preferably in the form of an angle bar, a portion of which projects into the bifurcated extremities 130 of the uprights and a fastening device 131, such as a cotter pin, detachably secures the cross bar to the uprights. A shaft 132 extends across the frame adjacent the uprights 111 and is journaled in bearings mounted upon suitable fixed supports 133, which latter are arranged adjacent the base of the machine. Sprocket wheels 134 are secured to the shaft 132 for rotation therewith and one of these sprocket wheels is located adjacent each side of the machine. Flexible members 135 in the form of sprocket chains are provided which pass each of the sprocket wheels 134. One extremity of each of these sprocket chains is secured to the cross bar 129 and the other extremities thereof support a counter-balancing weight 136. Thus it will be manifest that when the shaft 132 is rotated the sprocket wheels 134 which rotate therewith will operate upon the sprocket chains 135 to raise or lower the frame which supports the burners as well as raise and lower the counterbalancing weight 136. In order to rotate the shaft 132 another sprocket wheel is provided on the shaft 132 over which a sprocket chain 137 passes and this sprocket chain also passes over a sprocket wheel 138 on another shaft 139 which is arranged parallel with the shaft 132 and extends across the frame in a similar manner, the extremities thereof being journaled in suitable bearings on the supports 133. A flexible member 140, preferably in the form of a sprocket chain, passes over a sprocket wheel on the shaft 139 and also over another sprocket wheel on a shaft 141 located preferably about midway of the machine, (see particularly Figs. 2, 4 and 15). This shaft 141 is rotated by means of a pinion wheel 142 secured to the shaft and a toothed segment 143 is pivotally mounted as at 144, the teeth of which mesh with the pinion 142 and is adapted to impart a rotary motion to the pinion when the segment is oscillated about its point of pivotal support. This oscillatory motion is imparted to the segment by means of a cam 146 (see particularly Figs. 4 and 16) on a stub shaft 147 adjacent the shaft 91 and a gear 148 is secured for rotation with the cam 146 and this gear 148 meshes with a gear 149 on the shaft 91. The cam 146 is adapted to engage a projection 150 on an extension 151 of the segment 143. Thus it will be manifest that when the shaft 91 is rotated in the manner as has already been described, this rotary motion will be imparted to the cam 146 and as the latter rotates it will rock the segment 143 in one direction and thereby rotate the pinion 142 as well as the shaft 141 and this rotary motion of the shaft 141 will in turn be imparted to the shaft 132 through the medium of the connecting endless flexible members 140, 137 and the associated sprocket wheels. The segment will be moved in the opposite direction by the pinion 142 inasmuch as the weight 136 and other similar weights which will be hereinafter more specifically described tend to rotate the shaft 141 in the opposite direction when the high portion of the cam passes out of engagement with the projection 150 on the extension 151 of the segment 143.

After the mantle has been burned off by the burners 110 it is intermittently advanced to the shaping and hardening burners and in order to permit a complete burning off before the mantles reach the shaping and hardening burners, these latter burners are spaced the required distance from the first mentioned burners.

Two sets of burners 152, 153 are provided (see particularly Figs. 2, 4, 10 and 13) and are arranged to extend across the line of feeding movement of the mantles with one set arranged in advance of and spaced from the other set preferably a sufficient distance to permit the mantles by one step of advancing movement to move from the front series 152 to the rear series 153. These burners are adapted to be projected into the mantles 101 through the openings 105 in the supports 99 and through the tubular hanger members 100, as shown more clearly in Fig. 24.

As the construction of each set of burners is the same, the specific description of one set will apply equally as well to the others and as the individual burners of these sets are constructed the same, the description of one will also apply equally as well to the remaining burners.

The burners are connected to a head, designated generally by the reference numeral 154 (see particularly Fig. 20), having therein an air chamber 155 and a gas chamber 156. The head 154 is provided with a plurality of recesses into which the upper extremities of the burner tubes 152 project. The diameter of the ends of the burner tubes which are inserted into these recesses is somewhat less than the diameter of the recesses and the extremities of the burner tubes are provided with circumferential flanges 157. A collar 158 of a diameter to fit the recesses is sleeved over the burner tube so that the circumferential flange 157 will engage and rest upon one edge of the collar and the collar is secured against displacement with respect to the head 154 by suitable fastening devices 159. The bore of the collar through which the extremity of the burner tube projects is tapering or of increasing diameter from the inner end or the end against which the flange 157 rests to the outer end so that the burner tube will be suspended for free lateral movement with respect to the head. This construction is provided in order to permit the burner tips 160 to always enter the mantle properly and to permit the burner tubes to yield or shift in the event that the tip of the burner should strike one of the rings 104 of the mantle. The air chamber 155 has communication with the burner tube 152 through the medium of a passage 161 controlled by a needle valve 162 and the gas chamber 156 has communication with the recess into which the end of the burner tube is inserted by means of a passage 163 controlled by a needle valve 164 so that the mixture of air and gas which is supplied to the burner may be regulated. The extremity of the burner tip 160 is provided with a central reduced opening 165 with which a series of radial slots 166 communicate and this burner tip is removably secured to the extremity of the burner tube 152 by suitable fastening device 167 so that the burner tips may be readily removed when desired.

Both of the series of burners 152, 153 are supported for a vertical reciprocatory movement so as to move the burner tips into and out of the mantles at the proper time. In order to accomplish this the heads 154 of the respective series of burners 152 are removably supported between plates or members 168 arranged adjacent the ends of the heads and fastening devices 169 are provided which pass through open slots 170 in the plates or members 168 and into the ends of the heads. Trunnions 171 project beyond the members 168 and the trunnions 171 of the series of burners 152 are journaled in uprights 172 arranged on opposite sides of the machines and passed through suitable guides supported by the members 33 (see particularly Figs. 10, 12 and 13). The lower extremities of these uprights 172 are connected by means of a cross bar 173 similar to the manner in which the uprights 111 are connected by the cross bar 129 and these uprights 172 are adapted to be reciprocated vertically in order to raise and lower the burners 152 in a manner somewhat similar to the manner in which the uprights 111 are raised and lowered, that is, by means of flexible members 174 (see also Figs. 2, 4 and 13) which pass over sprocket wheels 175 on a shaft 176 extending across the machine with its ends journaled in suitable bearings. One extremity of these flexible members 174 are connected to the cross bar 173 and to the other extremities a counterbalancing weight 177 is connected. The shaft 176 is rotated by means of a pinion 178 with which the teeth of a segment 179 mesh. This segment is pivotally supported as at 180 and is provided with an arm or extension 181 having a projection 182 thereon which is adapted to be engaged by a cam 183 on a shaft 184. When the shaft is rotated the segment 179 will be moved about its pivot in one direction to rotate the shaft 176 and thereby elevate the burner head 154 and the burners 152. When the high portion of the cam passes out of engagement with the projection 182 on the segment, the weight of the parts will cause the burners 152 to be lowered so as to pass into the mantles. The shaft 184 receives its motion from the main driving shaft 91 through the medium of an idle gear 185 (see Fig. 4) which meshes with the gear 148 and also with the gear 186 on the shaft 184. The head 154 of the series of burners 153 is given its vertical movement in a similar manner and for this purpose the trunnions 171 of this head are journaled in the ends of uprights 187 which pass through suitable guides and the lower extremities thereof are connected by means of a cross bar 188 (see Fig. 10) similar to the manner in which the cross bar 129 connects the uprights 111. These uprights 187 are located in proximity to the shaft 141 as shown clearly in Fig. 2 and flexible members 189 in the form of sprocket chains pass over sprocket wheels 190 on the shaft 141 with one extremity connected with the cross bar 188 and supported by the other extremities of the flexible members is a counterbalancing weight 189. Inasmuch as these sprocket wheels 190 are secured for rotation with the shaft 141 and as the shaft 141 is rotated by the oscillation of the segment 143 already described, it will be manifest that when the shaft 141 is rotated in one direction, the uprights 187 as well as the series of burners 153 will be moved in one direction to raise the burners out of the mantles and when the shaft 141 is rotated in the opposite direction the burners will be lowered into the mantles. Suitable stop collars 190 may be provided on the uprights 172 and 187 for limiting the downward movements of the respective series of burners 152, 153.

In order to properly position the heads 154 of the respective series of burners 152, 153, so as to properly present them to the mantles in the event of wear of the parts, adjusting devices may be provided for each of the heads 152 (see particularly Figs. 11 and 12) in the form of an arm 191 which is connected with one of the trunnions 171 so as to depend below the heads. This arm 191 is provided with an enlarged extremity 192 having laterally projecting ears 193, one arranged on each side of the adjacent upright 172 and adjusting screws 194 are threaded through the respective ears 193 into engagement with opposite sides of the upright 172 and are adapted to rock the head 154 about its point of pivotal support. Lock nuts 195 are provided for the adjusting screws for holding them in their adjusted positions.

Gas is supplied to the burner head 154 of the series of burners 152 from the gas supply pipe 118 through the medium of a tube or pipe 196 (see particularly Figs. 1 to 4, and 13 and 15), which pipe 196 is provided with a hand valve 197, by means of which the supply of gas to the pipe may be shut off, and an upright portion 198. A flexible tubular member 199 is connected with the extremity of the upright portion 198 and also to a tube or pipe 200 which latter leads into the gas chamber of the head 154. A spring controlled valve 201 is provided preferably in the upright portion 198 of the pipe 196 and an operating handle 202 is adapted to open the valve. This valve 201 and the remaining gas and air controlling valves which are operated automatically, may be of any desired and well known construction and form no part of the present invention, suffice it to say that at certain intervals, the operating handles of the respective valves are actuated to open the valves, and the valves being of a spring action, are automatically closed at the proper time.

Air is supplied to the head 154 of the series of burners 152 through a pipe 203 (see particularly Figs. 4 and 13) which has communication with the air chamber of the head 154 and a tubular flexible member 204 is connected to the inlet of the tube 203 and also with a pipe 205 leading from the air supply pipe 117, (see Fig. 15), and a spring controlled valve 206, similar to the valve 201, is provided in the pipe 205 for automatically controlling the passage of air through this pipe. A hand valve 205ª is provided in this pipe for permanently cutting off the supply of air to the pipe and for regulating the amount of flow through the pipe.

The pipes 200, 203, are preferably rigidly connected with the head 154 and move upwardly and downwardly with the head, the flexible tubular members 199, 204, permitting this action.

Gas and air are supplied to the head 154 of the series of burners 153 in a similar manner and for this purpose a pipe 207 (see particularly Figs. 2, 4, 8 and 15) leads from the gas supply pipe 118 to a point adjacent the series of burners 153 and is provided at its ends with branch pipes 208, 209. The pipe 208 is provided with an upright extremity 210 to which one extremity of a tubular flexible member 211 is connected and the other extremity of this tubular member 211 is connected to a pipe 212, which latter discharges into the gas chamber of the head 154 of the series of burners 153. A spring controlled valve 213 similar to the valve 201 is provided in the upright pipe 210 and an operating handle 214 is also provided for opening the valve. A cut off valve 215 may also be provided in the pipe 208 for cutting off the supply of gas to the pipe 210. Air is supplied to this head 154 of the series of burners 153 from a pipe 216 leading from the air supply pipe 117 (see Figs. 3, 4 and 15) which extends parallel with the pipe 207 and terminates in two branch pipes 217, 218. The pipe 217 is provided with an upright portion 219 to which one extremity of a tubular flexible member 220 is connected. The other extremity of this tubular member 220 is connected at one extremity of a pipe 221 which latter discharges into the air chamber of the head 154 of the series of burners 153. A hand valve 222 (see Fig. 15) is provided in the pipe 217 for shutting off the supply of air to the pipe.

A spring controlled valve 223 similar to the valve 213 is provided in the upright portion 219 in the supply pipe and this valve is also provided with an operating handle similar to the handle 214.

The valves 201, 206, 213 and 223 are adapted to be automatically opened at the proper intervals in any suitable manner such as by means of cams operated from the main driving shaft 91 (see particularly Figs. 1 to 4, 10 and 13). The cams 224, 225, for respectively operating the gas and air valves 201, 206, are secured to the shaft 184 for rotation therewith and these cams are adapted to respectively operate upon the arms 226, 227 which latter are pivoted loosely upon a support 228, to rock the arms about the support in one direction and the arms are respectively connected by links 229 with the respective operating handles 202 of the valves 201, 206, so that when the shaft 184 is rotated in the manner as has already been described, the cams 224, 225, will operate to open the valves 201, 206. Inasmuch as one of these valves controls the supply of gas and the other controls the supply of air, and it is advisable to admit the supply of gas to the burners 152 in advance of the admission of the supply of air to the burners, the cam actuating the gas controlling valve may be so constructed with relation to the cam which controls the air supply valve so as to open the gas valve in advance of the air valve and the cam controlling the air valve may be arranged so that the air may be gradually supplied to the burners and thereby gradually increase the pressure or force of the flame at the burners to gradually shape the mantles.

The cams 230, 231, (see particularly Figs. 4 and 8) which control the valves 213, 223 are secured to the shaft 91 for rotation therewith and arms 232, 233, similar to the arms 226, 227, are mounted for rocking movement upon a support 234 and are respectively connected by means of links 235 similar to the links 229 with the operating handles 214 of the valves 223 and these cams 230, 231 are so constructed and arranged with respect to each other that one will operate to open its respective valve in advance of the other similar to the operation of the cams 224, 225.

The burners 152 preferably project below the tips of the series 153 so that when the burners 152 are inserted into the mantles, the tips will extend for some distance into the mantles to serve as a means for shaping and hardening the lower portion of the body of the mantles, while the tips of the series of burners 153 will not project to such an extent into the mantles, the object of this arrangement being that the last mentioned set of burners will operate upon the mantle to assist in shaping the same and also for the purpose of hardening the portion of the mantle and the stitching around the supporting ring 104.

After the mantles have passed from the burner 153, the next step of their advancing movement will cause them to assume positions over another set of burners 236 (see particularly Figs. 2, 4 and 8). These burners 236 are arranged some distance below the tips of the burners 152, 153, and project upwardly toward the tips and are connected to a head 237 similar to the heads 154. This head is adapted to be moved in a vertical plane so as to move the tips of the burners toward or away from the tips of the depending mantles, in a manner similar to the manner in which the heads 154 are moved, that is, by means of uprights 238, which move through suitable guides and to which the head 237 is pivotally connected as at 239.

The lower extremities of these uprights are detachably connected to a cross bar 240. Flexible members 241 pass over sprockets 242 (see also Fig. 2) with one extremity connected to the cross bar 240 and with a counterbalancing weight 243 connected to their other extremities. The sprockets 242 are secured to a shaft 244 which is adapted to be rotated by means of a pinion 245 secured thereto and with which pinion the teeth of a toothed segment 246 mesh. This segment is pivotally supported as at 247 preferably upon the support 234 and is provided with an extension 248 having a lateral projection 249 adapted to be engaged by a cam 250 secured to the shaft 91 so that when the shaft is rotated, the segment 246 will be oscillated and the head 237 with the burners 236 thereon will be correspondingly raised or lowered. The head 237 is adapted to be rocked so as to properly position the tips of the burners 236 in a manner somewhat similar to the heads 154, that is, by means of a depending arm constructed of sections 251, 252. The section 251 is connected with one of the end plates 253 and its free end is pivotally connected as at 254 (see particularly Fig. 9) to the adjacent end of the section 252. A pin and slot connection 255, 256 is also provided between the adjacent ends of the sections 251, 252, which pin is adapted to be loosened to permit the sections 251, 252 to be adjusted about the pivot 254, and when thus adjusted to be tightened to hold them in their adjusted positions. The section 252 is provided with a lateral projection 257 having a bifurcated portion to receive one of the uprights 238.

Gas and air are supplied to the head 237 of the burners 236 from the pipes 207, 216, and for this purpose the branch pipe 209 of the gas pipe 207 (see also Figs. 8 and 15) is connected by means of a tubular flexible member 258 with the inlet 260 similar to the valve 213 is provided in pipe 209 for automatically controlling the supply of gas through this tubular pipe 258. A cam 261 is provided on the shaft 91 for opening the valve 260 through the medium of an arm 262 pivoted to the support 234 and which arm is connected by means of a link 263 similar to the links 235 to the operating handle of the valve. The air is supplied to the head 237 from the air supply pipe 216 through the branch pipe 218 and also through a flexible tubular member 264 which latter has communication with the inlet opening 265 of the air chamber in the head 237. A spring controlled valve 266 similar to the valves 213, 223 and 260 is provided in the pipe 218 and this valve is adapted to be opened by means of a cam 267 on the shaft 91 which operates on an arm 268 pivoted to the support 234 and which arm 268 is connected by means of a link 269 with the operating handle of the valve 266. The flexible pipes 258, 264, will permit the head 237 to be raised and lowered. After the mantle tips have been hardened, the next step of advancing movement will cause the mantles to move away from the hardening burners 236. Obviously, the pressures in the series of burners 152, 153 and 236 may be varied with respect to each other by adjusting the various hand valves so that the desired and necessary pressures of the flame may be obtained for the shaping and hardening operations on the mantles.

After the mantles have passed from the burners 236 they will have been completely shaped and hardened and the next step of operation is their immersion into a preserving solution. It is necessary, however, that the mantles be allowed to become cool and in order to accomplish this the tank 270 (see particularly Figs. 2, 4 and 5) containing the solution into which the mantles are to be immersed may be arranged at a suitable distance from the burners 236. This tank 270 is adapted to be raised and lowered so as to be brought into a position to receive the mantles and after the mantles have been immersed to be lowered so as to move out of the way to permit the mantles to be further advanced and carried away from the machine. In order to accomplish this the tank 270 is mounted upon a suitable support 271 connected to uprights 272 which move in suitable guideways with their lower extremities connected by a connecting bar 273. Flexible members 274 pass over sprocket wheels 275 mounted upon a shaft 276 extending across the machine and journaled in suitable bearings. The flexible members 274 are connected by one extremity to the cross bar 273 and a counterbalancing weight 278 is connected to their other extremities. The shaft 276 is given a rotary motion by means of a crank arm 279 connected by a link 280, preferably to the gear 96 (see particularly Fig. 7) so that when the gear 96 is rotated in the manner as already described by the endless chain 93, the shaft 276 will be rotated and the tank 270 will be raised or lowered. The tank may be limited in its lowering movement by means of a stop collar 281 on one of the uprights 272 which engages a fixed body.

The liquid may be supplied to the tank 270 such as from a supply receptacle 282 supported by a bracket or support 283 on the frame of the machine and which has communication with the tank through the flexible supply pipe 284. Obviously the flow of liquid through this pipe may be controlled by any suitable controlling device, such as a pinch valve or clip (not shown) and which may be so adjusted as to permit only an amount of liquid to flow into the tank equal to the amount which has been removed by the mantles. The tank 270 is provided with an overflow outlet 285 to which is connected a discharge pipe 286 leading to any suitable point of discharge. The object of this overflow is to always maintain a proper amount of liquid in the tank. After the mantles have been immersed they will be advanced away from the tank and can then be removed from the machine.

In order to prevent the waste of gas in the burners during the adjustment of the burners out of and into operating positions, the automatic valves already described of the respective burners are adapted to completely shut off the supply of gas after the completion of each step of the operation and, in order to again ignite the burners at the proper time, pilot tubes or burners 287, shown more clearly in Figs. 3, 4 and 10, are provided adjacent each of the series of burners 152, 153 and 236. These pilot burners receive their supply of gas from the gas supply pipe 118 (see also Figs. 1 and 15) through a branch 288 to which is connected a pipe 289 having communication with each of the series of pilot burners 287. Valves 290 are provided for controlling the supply of gas to these pilot burners, as will be understood.

It is thought that the operation of the machine thus described as adapted for the manufacture of the inverted type of mantles will be fully understood from the above description but briefly stated it is as follows, reference being had particularly to Figs. 1 to 4: The mantles are supplied to the machine at the front end thereof and are slowly advanced to the burners 107 which latter are raised during the advancement of the mantles to the burner and when the mantles are in position, the burners are lowered to the mantles. During the raising and lowering movement of the burners a small amount of gas is supplied to these burners and when the burners are in position the full amount of gas is admitted to the burners. The mantle is subjected to the burning off step by these burners after which the burners are raised and the mantles intermittently advanced to the series of burners 152. As has been before stated, the distance between the burners 152 and the burners 110 is such as to insure a complete burning off and an extinction of the flame by the time the mantles reach the series of burners 152. As the mantles approach these burners 152, the latter are raised to permit the mantles to be positioned, the flame having been previously extinguished. The burners 152 are then lowered and being yieldingly mounted in the head 154 the burners will properly position themselves with respect to the mantles to enter the mantles. The series 152 of burners extends for some distance into the mantles and when in position the air is gradually supplied to the burners to gradually increase the pressure of the flame. This flame will shape the mantle and will harden the body or lower portion thereof. At the proper time these burners will be elevated, the flame extinguished and the mantles advanced to the next series of burners 153 where the same operation is performed with this variation, that the burners 153 do not extend into the mantle to such an extent as the burners 152. This difference is for the purpose of hardening what might be termed the rim of the mantle or the portion which surrounds the supporting ring 104 and the stitching therearound. The central opening in the burners will permit the flame to be directed to the bottom of the mantles. The pressures of the flames from these two series of burners 152, 153, may be regulated in the manner already described by the adjustment of the various hand regulating valves. After the mantle has been treated by the series of burners 153 it is advanced so that the tip thereof will be positioned above the series of burners 236, the latter having been moved in a direction away from the mantles to permit them to be positioned with respect to the burners, and then adjusted toward the mantles, during which adjustment the flame is extinguished. When in position and the burners lighted, the air is gradually admitted to the burners until the proper force or pressure is obtained and this blast of air against the tip of the burners will harden the tip. The mantle after it passes from the burners 236 has been completely shaped and hardened and from these burners it is advanced to the immersion tank 270, the latter being arranged a sufficient distance from the burners 236 to permit any flame carried by the mantles to be extinguished before the mantle reaches the tank. The tank is moved away from the line of movement of the mantles as the latter approach and when the mantles are in position the tank is moved toward the mantles to immerse the latter, after which the tank is again moved away from the mantles and the immersed mantles are conveyed away.

In order to adapt this machine for the manufacture of what is known as upright mantles the service of the series of burners 152, 153, must be dispensed with and the heads 154 may be held against reciprocatory movement by detaching the cross bars which connect the uprights to which the heads are connected and the stop collars 190 may be adjusted to hold the heads in elevated positions or if desired, the heads 154 may be allowed to reciprocate and the burners 152, 153 may be detached therefrom, it being of course understood that the supply of gas and air to these heads has been previously shut off by the actuation of the respective hand controlling valves. In place of the series of burners 152 there is provided another series of burners which are arranged adjacent the point of operation of the series of burners 152 (see particularly Figs. 2, 4 and 13). This additional series of burners is connected to a head 291 similar to the heads 154 which is arranged to operate adjacent the plane of operation of the burners 152. The head 291 is arranged below the head 154 and the burners project upwardy therefrom. This head 291 is supported by uprights 292 movable in suitable guides and the lower extremities of these uprights is adapted to be connected by a cross bar or rod similar to the cross bar or rod 173. When the head 154 carrying the burners 152 is in use, as shown in Fig. 13, the head 291 is rendered inactive and when the head 291 is to be employed the head 154 carrying the burners 152 is rendered inactive, by disconnecting the flexible members 174 from the cross bar 173 which is connected to the uprights 172 and connecting the flexible members with the cross bar connecting the uprights 292. This head 291 is adapted to be rocked about its points of pivotal connection 293 with the uprights 292 (see particularly Fig. 14) and a depending arm 294 is connected with the head and extends parallel with one of the uprights 292. An adjusting screw 295 passes through the arm 294 and has engagement with the upright and a lock nut 296 may be provided on the screw. Stop collars 297 are provided on the uprights 292 which serve as a means for limiting the downward movement of the head 291 and also a support for the head when the latter is not to be used. The pilot tubes 287 which are employed for the burners 152 may also be employed for the burners supported by the head 291. Gas and air are supplied to this head 291 from the supply pipes 118, 117, and for this purpose a branch pipe 298 leads from the gas supply pipe 118 (see Figs. 13 and 15) and is connected by means of a flexible tubular member 299 with a gas inlet 300 of the head 291. A spring controlled valve 301 similar to the valve 201 is provided in the pipe 298 and a cam 302 is provided on the shaft 184 for rocking the arm 303 which is connected by means of a link 304 with the operating handle of the spring controlled valve 301. A branch pipe 305 leads from the air supply pipe 117 and is connected by a flexible tubular member 306 with the air inlet 307 of the head 291. A spring controlled valve 308 similar to the valve 206 is provided for controlling the supply of air through this pipe and an arm 309 adapted to be actuated by a cam 310 on the shaft 184 is connected by a link 311 with the operating handle of the valve 308. Shut off valves 312, 313 are respectively provided in the pipes 298 and 305 for shutting off the supply of air and gas when the burners which are connected to the head 291 are not to be employed.

The burners which are connected to the head 291 are employed in the same capacity with the upright mantles as the series of burners 152 are employed with the inverted mantles, that is, they are adapted to shape and form the mantles. After the upright mantles have been shaped and formed by these burners, the mantles are advanced to the burners 236, which latter extend into the mantles so as to direct the flame against the end of the mantle to harden the latter. After the upright mantles have passed from the mantles 236 they are advanced to the immersion tank 270 and are operated upon in a manner similar to the inverted mantles.

In the manufacture of upright mantles, and after the "burning off" process, the lower open extremities of these mantles have a tendency to contract between the time they leave the burning off burners until they reach the shaping and forming burners. Unless some means is provided for preventing the open lower ends of these mantles from contracting to too great an extent, it will be manifest that the shaping burners could not readily be inserted into the mantles. In order therefore to overcome this objection and to give the mantles what might be termed a preliminary forming, after they leave the burning off burners, a series of burners 314 is provided (see particularly Figs. 1, 2 and 23). These burners 314 are connected to a head 315 and are supported by uprights 316 movable in suitable guides with their lower extremities connected by a cross bar 317 to which is secured one extremity of the flexible members 318 which pass over pulleys 319 on the shaft 139. A counterbalancing weight 320 is connected to the other end of the flexible members. Thus when the shaft 139 is rotated in the manner already set forth by the endless chains 140 the head 315 and burners 314 will be correspondingly raised and lowered. When the burners 314 are not to be used they may be thrown out of operation by disconnecting their lower extremities from the bar or member 317. The head 315 is adapted to be rocked about its point of pivotal connection with the uprights 316 by means of the arm 321 similar to the arm 119 as shown in Fig. 12.

Gas and air are supplied to the head 314 from the supply pipes 118, 117, through the medium of a pipe 322 which has communication with the gas supply pipe 118 preferably through the pipe 298 and a pipe 323 which communicates with the pipe 322. A flexible tubular member 324 is connected with a pipe 323 and also with a gas inlet 325 of the head 315. A supply pipe 326 is connected with the air pipe 117 and a flexible tubular member 327 has communication with this pipe 326 and also with the air inlet opening 328 of the head 315. A pilot tube 287 is located adjacent the burners 314 for igniting the burners at the proper time. These burners 314 are located in close proximity to the burning off burners 110 and preferably in such positions that at the completion of one step of advancing movement to the mantles when leaving the burning off burners, the mantles, while still burning, will assume positions over the burners 314 so that when the head 315 is elevated, the burners 314 will enter the mantles and any contracting of the lower open ends of the mantles will be retarded by the burner tubes. When the gas is turned on and the burners 314 ignited, only a sufficient pressure is applied to the mantles by these burners as to initially shape them. From these burners the mantles pass to the burners carried by the head 291 to be shaped thereby.

The flow of gas to the head 315 is controlled by a spring actuated valve 329 (see Fig. 13) the operating handle of which is actuated by a cam 330 on the shaft 184 through the medium of an arm 331 which is connected by a link 332 with the operating handle of the valve. The flow of air to the head 315 through the pipe 326 is controlled by a spring actuated valve 333 (see also Fig. 3), the operating handle 334 of which is connected by means of a link 335 to an arm 336 pivoted on the support 228 (see also Fig. 4) and this arm 336 is adapted to be rocked by a cam 337 on the shaft 184. Hand valves 338, 339 are provided respectively in the pipes 322, 326, whereby the supply of fluid to these pipes may be cut off.

Obviously the speed of the machine may be controlled at will by shifting the drive belt 81, as will be understood.

What is claimed as new is—

1. In a machine of the class described, the combination of a series of mantle conveyers arranged end to end and adapted to transfer the mantles from one to the other in succession, a bodily shiftable burner arranged adjacent the line of movement of the mantle by the conveyers for burning off the mantle, an interior calcining burner spaced from the first said burner, an intermediate shaping burner for preliminarily shaping the mantles as they leave the calcining burner, means for intermittently operating said conveyers relative to said burners at relatively different speeds, mechanism for imparting a vertical reciprocating movement to the burners, and means individual to the burners for counterbalancing the burners.

2. In a machine of the class described, the combination of a series of end to end conveyers adapted to transfer progressively from one to the other, means for intermittently advancing the conveyers at different speeds, a bodily shiftable burner arranged adjacent the line of movement of the mantle by the conveyers for burning off the mantle, an interior calcining burner spaced from the first said burner, mechanism individual to the burners for imparting vertical reciprocating movement to the burners, and means controlled by the conveyer advancing means and common to the burner reciprocating mechanism for actuating the latter.

3. In a machine of the class described, the combination of a series of end to end conveyers adapted to transfer the mantles progressively from one to the other, means for intermittently advancing the same at different speeds, a bodily shiftable burner arranged adjacent the line of movement of the mantle by the conveyers, an interior calcining burner also arranged adjacent the line of movement of the mantle, and spaced from the first said burner longitudinally of the line of movement of the mantle, means for imparting vertical reciprocating movement to the burners, means for supplying fuel to the burners, and means for automatically controlling such fuel supply.

4. In a machine of the class described, the combination of a plurality of variable speed conveyers adapted to transfer mantles from one to the other, means for intermittently advancing the same, a preliminary burner arranged adjacent the line of movement of the mantle by the conveyer for burning off the mantle, an interior calcining burner also arranged adjacent the line of movement of the mantle, and spaced from the first said burner longitudinally of the line of movement of the mantle, a shaping burner positioned between said burning off and calcining burners, means for imparting vertical reciprocating movement to the burners, means for supplying fuel to the burners, means for automatically controlling such fuel supply, and counterbalancing means for the burners.

5. In a machine of the class described, the combination of a plurality of mantle conveyers arranged end to end in alinement and adapted to pass the mantles from one to the next in order, means for intermittently advancing the same at different speeds, a preliminary burner arranged adjacent the line of movement of the mantle by the conveyers for burning off the mantle, an interior calcining burner also arranged adjacent the line of movement of the mantle, and spaced from the first said burner longitudinally of the line of movement of the mantle, a shaping burner positioned between said burning off and calcining burners for shaping the mantles as they leave the burning off means, means for imparting vertical reciprocating movement to the burners, means for supplying fuel to the burners, mechanism individual to the burners for automatically controlling the supply of fuel to the respective burners, and means common to all of the said fuel supply controlling mechanisms for actuating the latter.

6. In a machine of the class described, the combination of a mantle conveyer, a burner arranged adjacent the line of travel of the mantle, a second conveyer arranged adjacent the end of said first conveyer, means for imparting intermittent movement to the conveyers, a second burner adapted to be projected into the mantle, means timed with respect to the movement of said conveyers for imparting a vertical reciprocating movement to the burners, a third burner for hardening the tip of the mantle, and means for imparting a vertical reciprocating movement to the last recited burner.

7. In a machine of the class described, the combination of a plurality of mantle conveyers, a burner arranged adjacent the line of travel of the mantle, a second burner adapted to be projected into the mantle, an intermediate shaping burner, means for imparting a vertical reciprocating movement to the burners, a third burner for hardening the tip of the mantle, means for intermittently moving said conveyers at different speeds relatively to said burners, means for supplying fuel to the burners, and means for automatically controlling such supply.

8. In a machine of the class described, the combination of a plurality of mantle conveyers, a burner arranged adjacent the line of travel of the mantle, a second burner adapted to be projected into the mantle, an intermediate shaping burner operable at low pressure, means for imparting a vertical reciprocating movement to the burners, a third burner for hardening the tip of the mantle, means for intermittently moving said conveyers at different speeds relatively to said burners, means for supplying fuel to the burners, and means individual to the burners for automatically controlling the supply of fuel to the respective burners.

9. In a machine of the class described, the combination of a plurality of mantle conveyers, a burner arranged adjacent the line of travel of the mantle, a second burner adapted to be projected into the mantle, an intermediate shaping burner adjacent said first burner, means for imparting vertical reciprocating movement to the burners, a third burner for hardening the tip of the mantle, means for imparting a vertical reciprocating movement to the last recited burner, means for intermittently moving said conveyers in unison at different speeds relatively to said burners, means for supplying fuel to the burners, and means individual to the burners for automatically controlling the supply of fuel to the burners, the last recited means embodying means whereby the pressure of the flame may be gradually increased.

10. In a machine of the class described, the combination of a plurality of mantle conveyers, a burner arranged adjacent the line of travel of the mantle, a second burner arranged adjacent said mantle conveyers and adapted to be projected into the mantle, means for imparting vertical reciprocating movement to the burners, a third burner for hardening the tip of the mantle, means for imparting a vertical reciprocating movement to the last recited burner, means for intermittently moving said conveyers in unison at different speeds relatively to said burners, means for supplying fuel to the burners, and means individual to the burners for automatically controlling the supply of fuel to the burners, the last recited means embodying means whereby the pressure of flame will be gradually increased and the second and third recited burners will be extinguished during their shifting movements.

11. In a machine of the class described, the combination of a mantle support, a series of conveyers arranged to transfer the support from one to the other, a bodily shiftable burner for burning off the mantle, a preliminary shaping burner, means for intermittently propelling said conveyers at relatively different speeds with respect to each other and to said burners, means operatively related to the conveyer operating means for moving the burners toward and away from the mantle, and means for increasing the flames of the burners as the burners approach the mantle and for decreasing the flame as the burners move away from the mantle.

12. In a machine of the class described, the combination of a mantle support, a plurality of conveyers for the support, a bodily shiftable burner for burning off the mantle, a preliminary shaping burner adapted to act on said mantles with a soft flame, means for moving said conveyers to carry the mantle at different speeds relatively to said burners, means for moving the burners toward and away from the mantle, and means individual to the burners for increasing the flame of the burners as the burners are positioned with respect to the mantle, and for decreasing the flame as the burners move away from the mantle.

13. In a machine of the class described, the combination of a mantle support, a conveyer for the support, means for intermittently advancing the conveyer, means for burning and shaping the mantle while the latter remains upon the conveyer, a second conveyer to which the mantle is transferred, a tank into which the mantle is dipped after passing from the said means, and means operatively related to the conveyer advancing means for moving the tank into and out of position to receive the mantle while the latter is supported by the second conveyer, the said tank moving means embodying mechanism for locking the tank in its adjusted positions and for automatically unlocking the tank.

14. In a machine of the class described, the combination of a mantle support, a conveyer for the support, means for intermittently advancing the conveyer, operating mechanism for said means, means for burning and shaping the mantle, a second intermittent conveyer to which said mantle is transferred, a tank positioned below said second conveyer and into which the mantle is dipped after passing from the last said means, mechanism for moving the tank into and out of position to receive the mantle, and an operative connection between the operating mechanism for the conveyer advancing means and the mechanism for moving the tank, said connection embodying means for rendering the conveyer advancing mechanism inactive while the tank moving mechanism remains active.

15. In a machine of the class described, the combination of a mantle support, a second conveyer adapted to receive the support from said conveyer and carry it at a lesser speed, a conveyer for the support, means for intermittently advancing the conveyers, operating mechanism for said means, means for burning and shaping the mantle, a tank arranged in juxtaposition to said second conveyer and into which the mantle is dipped after passing from the last said means, mechanism for moving the tank into and out of position to receive the mantle and an operative connection between the operating mechanism for the conveyer advancing means and the mechanism for moving the tank, said connection embodying means for rendering the conveyer advancing mechanism inactive while the tank moving mechanism remains active, said conveyer advancing means being adapted to be rendered active automatically.

16. In a machine of the class described, the combination of a mantle support, a conveyer for the support, means for intermittently advancing the conveyer, operating mechanism for said means, means for burning and shaping the mantle, a slow speed conveyer for receiving the mantle support after the mantle has been burned and shaped, a tank into which the mantle is dipped while the support is upon the second conveyer, mechanism for moving the tank into and out of position to receive the mantle and an operative connection between the operating mechanism for the conveyer advancing means and the mechanism for moving the tank, said connection embodying means for rendering the conveyer advancing mechanism inactive while the tank moving mechanism remains active, said conveyer advancing means being adapted to be rendered active and inactive automatically.

17. In a machine of the class described, the combination of a mantle support, a pair of conveyers for the support traveling at relatively different speeds, the support being transferred from one conveyer to the other, means for intermittently advancing the conveyers, operating mechanism for said advancing means, means for burning and shaping the mantle, a tank into which the mantle is dipped, means operatively related to the said operating mechanism for moving the tank into and out of position to receive the mantle, and a dash pot operatively connected with the conveyer advancing means for retarding the movement of the latter.

18. In a machine of the class described, the combination of a mantle support, a pair of conveyers for the support arranged end to end, means for intermittently advancing the conveyers at relatively different speeds, burners associated with one of said conveyers for burning off and shaping the mantle and to which burners the mantle is successively advanced, a tip hardening burner to which the mantle is also advanced by the latter conveyer, means for bodily moving the burners toward and away from the mantle, a dipping tank associated with the other conveyer and to which the mantle is advanced, and means for moving the tank toward and away from the mantle.

19. In a machine of the class described, the combination of a mantle support, a pair of conveyers for the support arranged end to end, means for intermittently advancing the conveyers in unison at relatively different speeds, burners associated with one of said conveyers for burning off and shaping the mantle and to which burners the mantle is successively advanced, a tip hardening burner also associated with said conveyer and to which the mantle is also advanced by the conveyer, means for bodily moving the burners toward and away from the mantle, a dipping tank associated with the other conveyer and to which the mantle is advanced, means for moving the tank toward and away from the mantle, and counterbalancing means individual to the burners and the tank.

20. In a machine of the class described, the combination of a mantle support, a relatively high speed conveyer for the support, means for intermittently advancing the support, a preliminary burner associated with said conveyer and to which the mantle is subjected, a relatively low speed conveyer for receiving the support from the other conveyer, one or more calcining burners associated with said low speed conveyer and adapted to be projected into the mantle, means for vertically reciprocating the burners, a tip hardening burner, said burners being spaced from each other longitudinally of the line of travel of the mantle.

21. In a machine of the class described, the combination of a mantle support, a conveyer for the support, means for intermittently advancing the support, a preliminary burner to which the mantle is subjected, a second conveyer and one or more calcining burners associated therewith and adapted to be projected into the mantle, means for vertically reciprocating the burners, a tip hardening burner, said burners being spaced from each other longitudinally of the line of travel of the mantle, means for supplying fuel to the burners, and means whereby the flames of the respective burners may be maintained at different pressures.

22. In a machine of the class described, the combination of a mantle support, a relatively high speed conveyer for the support, means for intermittently advancing the support, a preliminary burner to which the mantle is subjected, a relatively low speed conveyer for the support and one or more calcining burners associated therewith and adapted to be projected into the mantle, means for vertically reciprocating the burners, a tip hardening burner, said burners being spaced from each other longitudinally of the line of travel of the mantle, means for supplying fuel to the burners, means whereby the flames of the respective burners may be maintained at different pressures, and means for automatically controlling the flames.

23. In a machine of the class described, the combination of a mantle support, a relatively high speed conveyer for the support, means for intermittently advancing the support, a preliminary burner to which the mantle is subjected, a relatively low speed conveyer for the support and one or more calcining burners associated therewith and adapted to be projected into the mantle, means for vertically reciprocating the burners, a tip hardening burner, said burners being spaced from each other longitudinally of the line of travel of the mantle, means for supplying fuel to the burners, means whereby the flames of the respective burners may be maintained at different pressures, and means for automatically controlling the flames, and the last said means embodying means whereby the flame of the burner will be increased when the burner is moved toward the mantle and decreased when the burner is moved away from the mantle.

24. In a machine of the class described, the combination of a mantle support, a burner to which the mantle is subjected, means for positioning the mantle with respect to the burner, means for projecting the burner into the mantle, and means whereby the burner will automatically adjust itself laterally with respect to the mantle.

25. A machine of the class described, embodying in combination a burner head, provided with a tapered recess, a burner having a tubular body, one end of the body loosely projecting into the recess for free lateral movement in the recess, and means for securing the burner against displacement with relation to the head and for free movement with respect thereto.

26. A machine of the class described embodying a burner head having a recess opening through one face, a burner proper having a tubular body projecting into the recess, the diameter of that portion of the body within the recess being somewhat less than the diameter of the recess, and a tapered collar for securing the end of the burner body in the recess and for free movement with respect to the head.

27. A burner comprising a head, having a recess through one face, a burner proper having a tubular body projecting into the recess, that portion of the body within the recess being of a diameter somewhat less than the diameter of the recess, a shoulder on the burner body within the recess, and a bushing supported by the said head and abutting with the shoulder for securing the burner to the head for free and independent movement with respect thereto.

28. A burner comprising a recessed head, a burner proper having a tubular body provided with a peripheral shoulder, the shouldered portion of the burner extending into the recess of the head and being of a diameter somewhat less than the diameter of the recess, a collar through which the burner projects, said collar projecting into the recess and engaging the shoulder on the burner, and means for securing the collar against displacement, the interior diameter of the collar being greater than the exterior diameter of the burner.

29. A burner comprising a recessed head, a burner proper having a tubular body provided with a peripheral shoulder, the shouldered portion of the burner extending into the recess of the head and being of a diameter somewhat less than the diameter of the recess, a collar through which the burners project, said collar projecting into the recess and engaging the shoulder on the burner, and means for securing the collar against displacement, the opening in the collar being of greater diameter than the diameter of the burner and gradually increasing in size from the inner end outwardly.

30. A burner comprising a head having an outwardly opening recess, a burner proper having a tubular body provided with a circumferential flange at one end, said flanged end projecting into the recess, a collar also extending into the recess and through which collar the burner projects with its flanged end engaging the inner end of the collar, the opening in the collar being of a diameter greater than the exterior diameter of the burner and less than the diameter of the flange, and means for securing the collar removably in place.

31. A burner comprising a head having an outwardly opening recess, a burner proper having a tubular body provided with a circumferential flange at one end, said flanged end projecting into the recess, a collar also extending into the recess and through which collar the burner projects with its flanged end engaging the inner end of the collar, the opening in the collar being of a diameter greater than the exterior diameter of the burner and less than the diameter of the flange, and means for securing the collar removably in place, the said opening in the collar gradually increasing in size from the inner end outwardly whereby the burner will be loosely secured to the head.

32. In a machine of the class described, the combination of a mantle support, means for intermittently advancing the support at different speeds, a burner to which the mantle is subjected, a bodily adjustable preliminary shaping burner adapted to be projected into the mantle as it comes from the first recited burner, and a burner for shaping and hardening the mantle as it comes from the second recited burner.

33. In a machine of the class described, the combination of a mantle support, means for advancing the support at different speeds, a preliminary burner to which the mantle is subjected, a shaping burner adapted to be projected into the mantle for shaping and hardening the mantle after it leaves the first said burner, and intermediate means for preventing the open end of the mantle from contracting after it leaves the first said burner and before is reaches the second recited burner.

34. In a machine of the class described, the combination of a mantle support, means for burning off the mantle, a conveyer associated with said burning-off means for moving the support at a certain speed, a shaping burner spaced from the first recited burner and adapted to be projected into the mantle, an intermediate burner disposed between the said burners and adapted to be inserted into the mantle for partially shaping the mantle and for preventing the open end of the mantle from contracting before it reaches the second recited burner, and a second conveyer associated with said shaping and intermediate burners for moving the mantle at a relatively different speed.

35. In a machine of the class described, the combination of a mantle support, means for burning off the mantle, a shaping burner spaced from the first recited burner and adapted to be projected into the mantle, conveyers for said support associated with and traveling at different speeds relatively to said burning-off means and said shaping burner, an intermediate burner disposed between the said burners and adapted to be inserted into the mantle for partially shaping the mantle and for preventing the open end of the mantle from contracting before it reaches the second recited burner, and means for imparting vertical reciprocating movements to all of said burners.

36. In a machine of the class described, the combination of a mantle support, a burner adapted to be projected into the mantle, a support for the burner, mechanism for advancing the mantle to the burner, means whereby the burner may be universally moved with respect to its support to automatically position the burner with respect to the opening in the mantle, and means operatively related to the said mechanism for imparting a vertical reciprocating movement to the burner.

37. In a machine of the class described, the combination of a mantle support, one or more burners to which the mantle is subjected, mechanism for intermittently advancing the support, means whereby the burners may be universally moved with respect to the support to automatically position the burners with relation to the mantle, means operatively related to the said mechanism for imparting vertical reciprocating movement to the burner, and means individual to the burners whereby they may be rendered inactive with relation to the said mechanism while the latter remains active.

In testimony whereof I have signed my name to this specification, in the presence of two subscribing witnesses, on this 26th day of May A. D. 1911.

ALFRED D. ANTOINE.

Witnesses:
J. H. JOCHUM, Jr.,
NINA J. HALSNE.

Copies of this patent may be obtained for five cents each, by addressing the "Commissioner of Patents, Washington, D. C."